(12) United States Patent
Kobayashi et al.

(10) Patent No.: US 10,850,777 B2
(45) Date of Patent: Dec. 1, 2020

(54) VEHICLE

(71) Applicant: HONDA MOTOR CO., LTD., Tokyo (JP)

(72) Inventors: Shinji Kobayashi, Wako (JP); Tetsutaro Takasugi, Wako (JP); Anthony M. Schroeder, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 125 days.

(21) Appl. No.: 16/202,440

(22) Filed: Nov. 28, 2018

(65) Prior Publication Data

US 2020/0164931 A1    May 28, 2020

(51) Int. Cl.
| | | |
|---|---|---|
| B62D 33/02 | (2006.01) | |
| B62K 5/01 | (2013.01) | |
| B62J 7/06 | (2006.01) | |
| B62J 7/04 | (2006.01) | |

(52) U.S. Cl.
CPC ............... *B62D 33/02* (2013.01); *B62J 7/04* (2013.01); *B62J 7/06* (2013.01); *B62K 5/01* (2013.01)

(58) Field of Classification Search
CPC .... B62D 33/02; B62K 5/01; B62J 7/06; B62J 7/04

USPC ................................ 296/183.1, 3, 182.1
See application file for complete search history.

(56) References Cited

U.S. PATENT DOCUMENTS

| | | | | |
|---|---|---|---|---|
| 4,826,057 | A * | 5/1989 | Yamada ..................... | B62J 7/04 180/215 |
| 5,573,162 | A * | 11/1996 | Spencer ..................... | B62J 9/00 224/401 |
| 7,854,460 | B2 | 12/2010 | Tweet et al. | |
| 8,646,668 | B2 * | 2/2014 | Oakes ..................... | B60R 9/065 224/401 |
| 2007/0045368 | A1 * | 3/2007 | Lavelle ..................... | B60R 9/00 224/524 |

* cited by examiner

Primary Examiner — Jason S Morrow
Assistant Examiner — E Turner Hicks
(74) Attorney, Agent, or Firm — Rankin, Hill & Clark LLP

(57) ABSTRACT

A vehicle is provided in which a plurality of attachment connecting portions are provided easily and the functionality of a carrier can be improved. A front carrier includes a pair of left and right side resting portions. The side resting portion includes a resting plate forming a loading surface and including edge portions of mounting holes as a plurality of attachment connecting portion. The resting plate includes cut-out portions inside corner portions thereof.

14 Claims, 14 Drawing Sheets

VEHICLE

BACKGROUND OF THE INVENTION

Field of the Invention

The present invention relates to a vehicle.

Description of the Related Art

Conventionally, there is known a vehicle having a carrier including a plurality of attachment connecting portions (for example, refer to U.S. Pat. No. 7,854,460).

In U.S. Pat. No. 7,854,460, since a plurality of attachment connecting portions are provided individually on frame members of a carrier, the number of parts is increased, and the attachment to the frame members becomes complex.

In addition, since some of the attachment connecting portions are attached to corner portions of the frame members, for example, in the case where the vehicle gets stuck as a result of its wheel or wheels being caught by a road surface covered with mud or snow, when attempting to move the vehicle by a rider or the like, the number of portions on the carrier to be gripped by the hands of the rider or the like is reduced. Further, a structure is desired which can ensure the function of the carrier when no attachment is attached thereto.

An object of the invention is to provide a vehicle in which a plurality of attachment connecting portions are provided easily and the functionality of a carrier can be improved.

SUMMARY OF THE INVENTION

There is provided a vehicle comprising a carrier (32, 33) having resting portions (51, 53) on an upper portion of a body, the carrier (32, 33) being formed by combining frame members (71, 72, 91, 92) into a grid shape, wherein the carrier (32, 33) comprises a pair of left, and right the resting portions (51, 53), wherein the resting portion (51, 53) comprises a plate member (73, 93) forming a loading surface and including a plurality of attachment connecting portions (73h, 73j, 73k, 73m, 93h, 93j, 93k, 93m), and wherein the plate member (73, 93) comprises a cut-out portion (73e, 73g, 93e, 93g) inside a corner portion (71b, 71c, 91b, 91c) of the resting portion (51, 53).

In the configuration described above, the frame members (71, 72, 91, 92) may form a plurality of bridge portions (72, 75, 92, 95) disposed before and after, the left and right resting portions (51, 53) may be connected together by the bridge portions (72, 75, 92, 95), and at least one of the bridge portions (72, 92) may be disposed so as to extend across a left end and a right end of the left and right resting portions (51, 53).

Additionally, in the configuration described above, the plurality of attachment connecting portions (73h, 73j, 73k, 73m, 93h, 93j, 93k, 93m) may be offset from each other in a front-and-rear direction or a vehicle's width direction.

In the configuration described above, the plate member (73, 93) may comprise a space forming cut-out portion (73f, 93f) configured to form a space between the frame member (71, 91) and the plate member (73, 93) on one side of the plate member which is connected to the frame member (71, 91) of the resting portion (51 53).

Additionally, in the configuration described above, the bridge portion (72, 92) may be exposed from the space forming cut-out portion (73f, 93f).

In the configuration described above, the space forming cut-out portion (73f, 93f) may be positioned between the plurality of attachment connecting portions (73k, 73m, 93k, 93m).

Additionally, in the configuration described above, a base portion forming a base structure of the carrier (32, 33) may be formed by a single frame member (71, 91) and the single frame member (71, 91) may include one of the bridge portions (75, 95).

In addition, the single frame member (71, 91) may comprise a loop portion (71a, 91a) provided at each of both end portions of the single frame member, the loop portion being formed into a closed loop shape, and the plate member (73, 93) may be attached to a front portion a side portion and a rear portion of the loop portion (71a, 91a).

In the vehicle, since the carrier includes the pair of left and right resting portions, and the resting portion includes the plate member forming the loading surface and including the plurality of attachment connecting portions, the testability of the frame shaped carrier can be improved, and the plurality of attachment connecting portions can be formed easily on the plate member.

In addition, since the plate member includes the cut-out portion inside the corner portion of the resting portion, the rider or the like can easily grip on the corner portion, and when he or she needs to push or pull the vehicle, the vehicle can be handled by the hands of the rider or the like. Additionally, when goods are rested on the carrier with no attachment attached thereto, a rope or the like can be hung on the carrier. Thus, the functionality of the carrier can be improved.

In the configuration described above, the plurality of bridge portions disposed before and after are formed by the frame members, the left and right resting portion are connected together by the bridge portions, and at least one bridge portion is disposed so as to extend across the left end and the right end of the left and right resting portions. Thus, the rigidity of the carrier can be enhanced by connecting the left and right resting portions by the plurality of bridge portions. Additionally, the rigidity of each of the left, and right resting portions can be improved by at least one bridge portion.

In the configuration described above, since the plurality of attachment connecting portions are offset from each other in the front-and-rear direction or the vehicle's width direction, a plurality of attachments can be connected to the carrier.

In the configuration described above, since the plate member includes the space forming cut-out portion configured to form the space between the frame member and the plate member on the one side of the plate member that is connected to the frame member of the resting portion, the weight of the plate member can be reduced, and hence, this can lead to a reduction in weight of the carrier. Additionally, the frame of the carrier can easily be reached, whereby an intermediate portion of the carrier can be used for handling by the hands or hanging a rope or the like.

In the configuration described above, since the bridge portion is exposed from the space forming cut-out portion, a reduction in rigidity due to forming the space forming cut-out portion in the plate member can be compensated for by the bridge portion. Additionally, the bridge portion can easily be reached, whereby the bridge portion can be used as a hanging part for a rope or the like, and hence, the configuration can be applied to many applications.

In addition, in the configuration described above, since the space forming cut-out portion is positioned between the plurality of attachment connecting portions, the attachment connecting portions can be provided in the plate member while avoiding the space forming cut-out portion.

Additionally, in the configuration described above, since the base portion forming the base structure of the carrier is made up of the single frame member, and this single frame member includes one of the bridge portions, the number of parts can be reduced by making up the base portion using the single frame member, and hence, the cost can be reduced.

In the configuration described above, since the single frame member includes the loop portion, which is formed into the closed loop shape, at each of both the end portions thereof, and the plate member is attached to the front portion, the side portion and the rear portion of the loop portion, the strength and rigidity of the loop portion can be enhanced by the plate member.

BRIEF DESCRIPTION OF THE DRAWINGS

FIGS. 12A and 12B are plan views illustrating a storage portion and a maintenance opening at the front portion of the body, in which FIG. 12A is a plan view illustrating a state where a storage portion lid and a maintenance lid are closed, and FIG. 12B is a plan view illustrating a state where the storage portion lid and the maintenance lid are removed;

DETAILED DESCRIPTION OF THE PREFERRED EMBODIMENT

Figure 1:
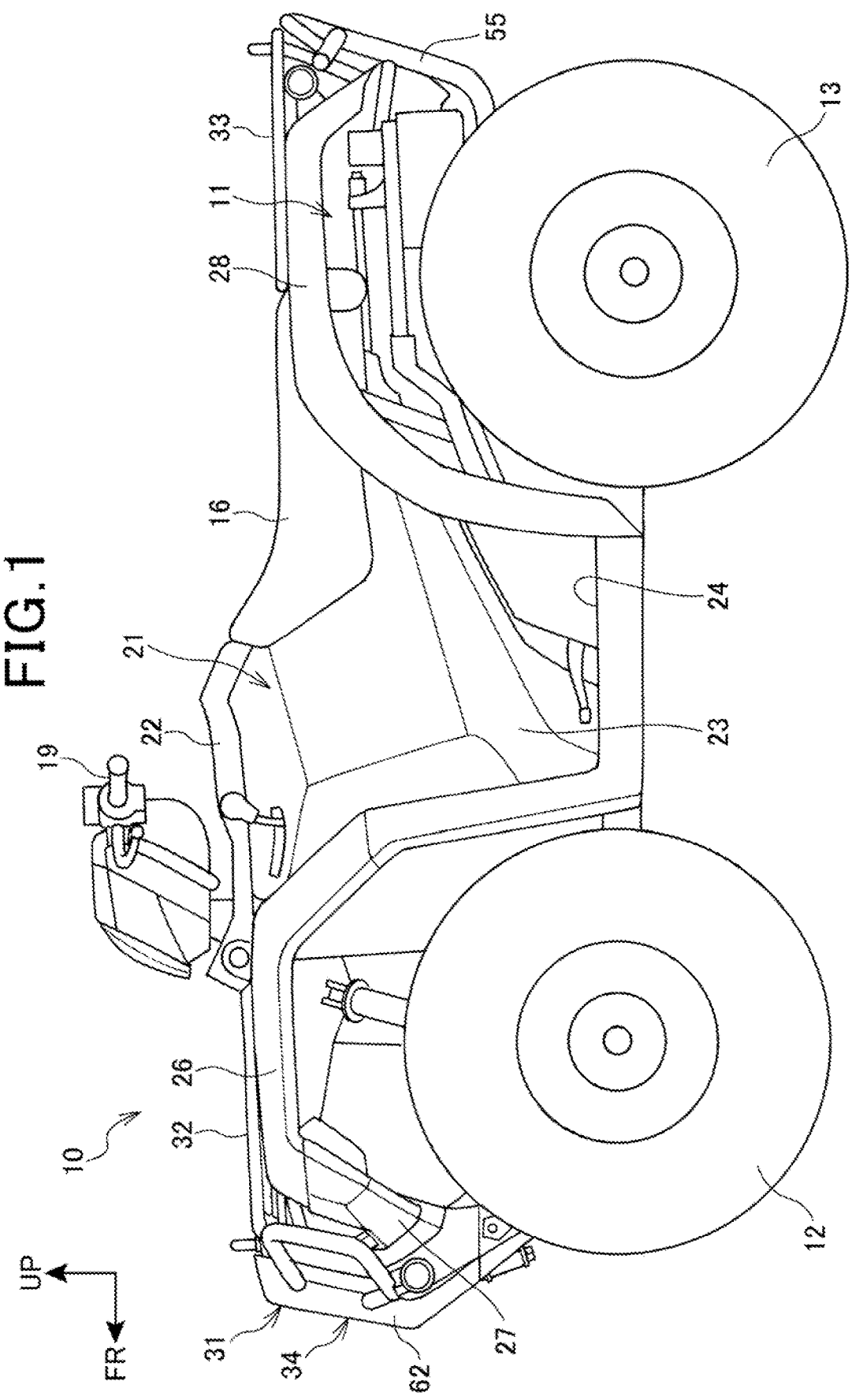
FIG. 1 is a left side view of: an all-terrain running vehicle according to an embodiment of the present invention.

Hereinafter, referring to drawings, an embodiment of the present invention will be described. In the following description, when referred to, directions denoting front, rear, left, right, up and down coincide with those directions with respect to a body of a vehicle unless described otherwise. In addition, when shown in the drawings, reference character FR denotes a front of the body, reference character UP denotes a top of the body, and reference character LH denotes a left of the body.

FIG. 1 is a left side view of a rough-terrain or all-terrain running vehicle 10 according to an embodiment of the present invention.

The all-terrain running vehicle 10 (hereinafter, referred to simply as the "vehicle 10") includes a body frame 11, a pair of left and right front wheels 12, a pair of left and right rear wheels 13, and a power unit (not shown).

The left and right wide front wheels 12 are mounted at a front portion of the body frame 11 via suspension arms, not shown, and the left and right wide rear wheels 13 are mounted at a rear portion of the body frame 11 via suspension arms, not shown.

The power unit made up of an engine and a transmission is mounted at a central portion of the body frame 11, and the left and right front wheels 12 and the left and right rear wheels 13 are each driven by the power unit.

The vehicle 10 is a saddle riding vehicle in which a rider straddles a seat 16 supported at an upper portion of the body frame 11.

A handlebar 19 is provided at a front of the body of the vehicle 10 to steer the left and right front wheels 12.

The vehicle 10 includes a body cover 21 configured to cover the body frame 11.

The body cover 21 includes a center cover 22, a pair of left and right body side covers 23, a pair of left and right, footrest floors 24, a pair of left and right front mudguards 26, a front cover 27, and a pair of left and right rear mudguards 28.

The center cover 22 is disposed below the handlebar 19 and at a front of the seat 16. The left and right body side covers 23 extend downwards from both edges of the center cover 22. The pair of left and right footrest floors 24 are disposed below the body side covers 23 and constitute portions where the rider rests his or her feet. The left and right front mudguards 26 are disposed ahead of the left and right footrest floors 24 so as to cover the left, and right front wheels 12 from above.

The front cover 27 covers a front end portion of the body. The left and right rear mudguards 28 are disposed behind the left and right footrest floors 24 so as to cover the left and right rear wheels 13 from above.

A front bumper 31 is disposed at a front of the front cover 27. A front carrier 32 is disposed above the left and right front mudguards 26, and a rear carrier 33 is disposed above the left and right rear mudguards 28.

Figure 2:
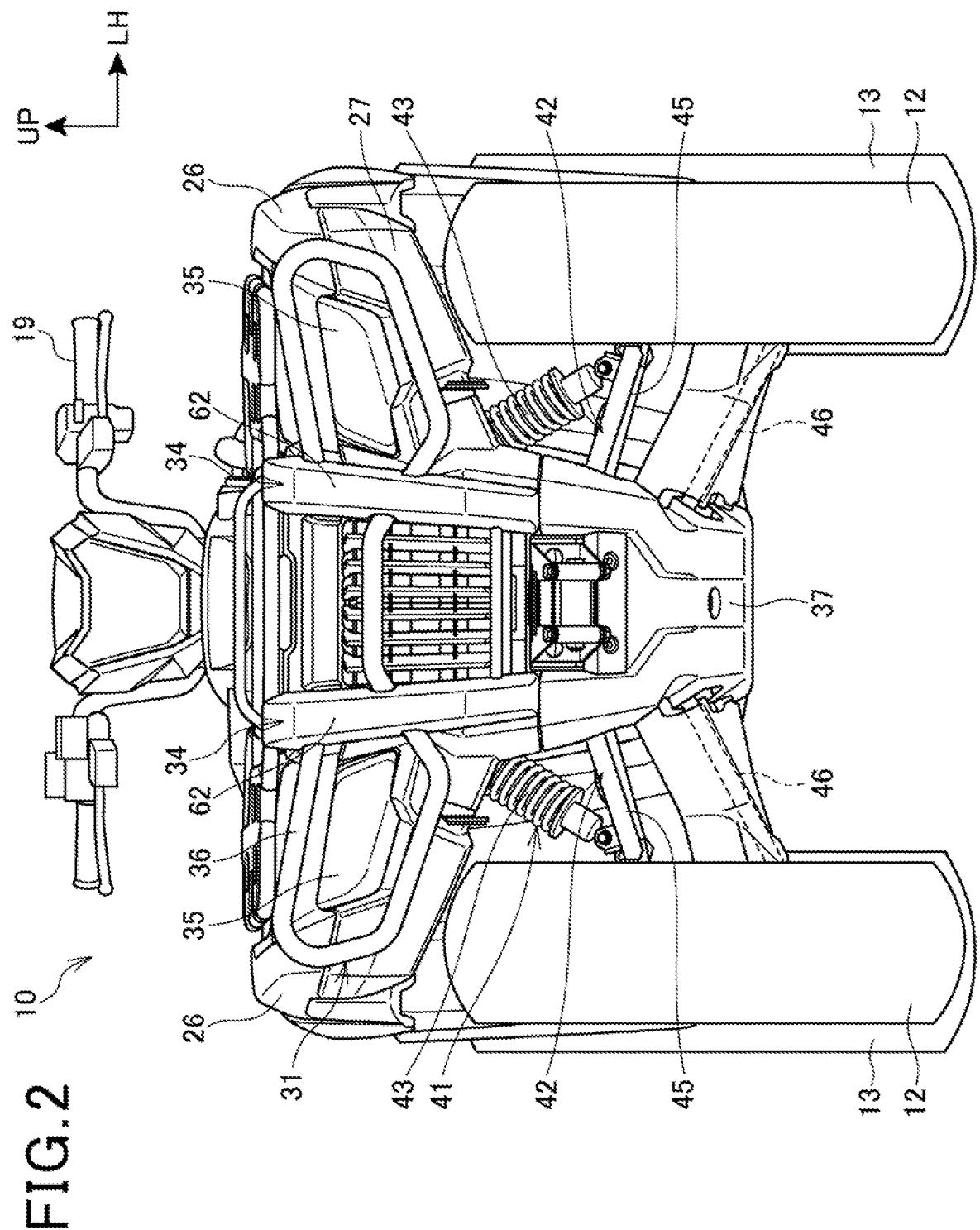
FIG. 2 is a front view of the vehicle.

FIG. 2 is a front view illustrating the vehicle 10.

A pair of left and right headlamps 35 and the front bumper 31 are provided at the front portion of the body, and the front bumper 31 covers the front, portion of the body from a central portion of the front portion of the body to peripheries of the left and right; headlamps 35 from the front of the vehicle.

The left and right headlamps 35 are disposed between the left and right front mudguards 26 and the front cover 27.

The front bumper 31 is made up of a pair of left and right upwardly/downwardly extending portions 34 configured to extend in an up-down direction and a transversely extending portion 36 configured to surround the peripheries of the left and right headlamps 35 and to extend in a vehicle's width direction.

A skid plate 37 attached to a lower portion of the front portion of the body frame 11 (refer to FIG. 1) is provided below the front bumper 31. The skid plate 37 protects the lower portion of the front portion of the body frame 11 and a lower portion of the power unit from projecting portions on a road surface or flying pieces of stone.

The left and right front wheels 12 are suspended by front suspensions 41, respectively. The front suspensions 41 include a pair of left and right suspension arms 42 upwardly/downwardly swingably attached to the body frame 11 and front cushion units 43, which are shock absorbers extended to the left and right suspension arms 42 and the body frame 11.

The left and right suspension arras 42 are each made up of an upper arm 45 and a lower arm 46 which are both swingably supported on the body frame 11. Distal ends of the upper arm 45 and the lower arm 46 are both swingably connected to a knuckle (not shown), and the front wheel 12 is supported rotatably on the knuckle.

Lower end portions of the left and right front cushion units 43 are connected to the left and right upper arms 45.

Figure 3:
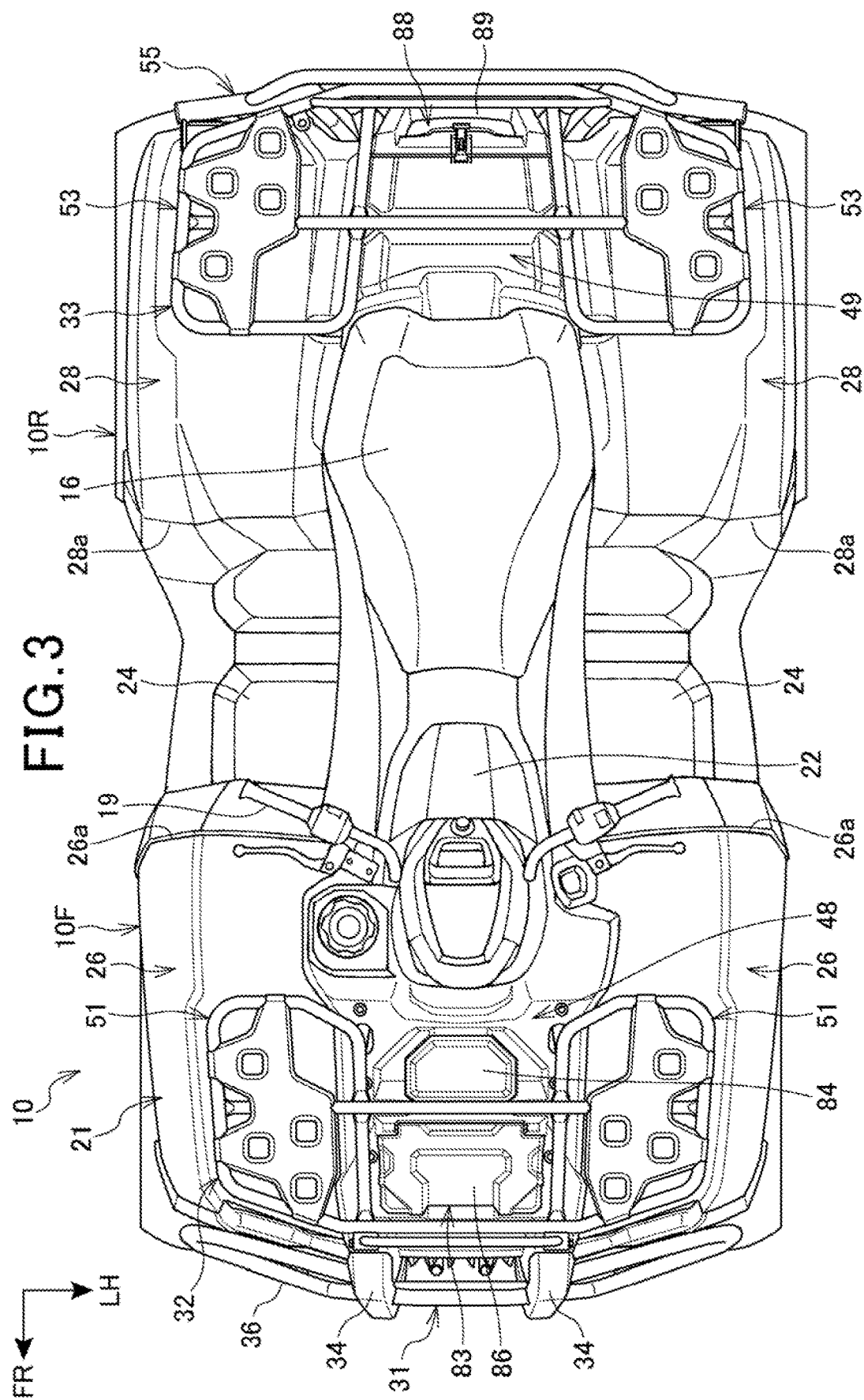
FIG. 3 is a plan view of the vehicle.

FIG. 3 is a plan view illustrating the vehicle 10.

In the vehicle 10, as a matter of convenience, a portion of the body located further ahead of the vehicle than rear edges 26a of the left and right front mudguards 26 is referred to as a front body 10F, and a portion of the body located further behind front edges 23a of the left and right rear mudguards 28 is referred to as a rear body 10R.

The transversely extending portion 36 of the front bumper 31 extends in the vehicle's width direction between the left and right upwardly/downwardly extending portions 34, and is inclined so as to be located rearwards gradually as the transversely extending portion 36 extends transversely outwards, transversely outwards of the left and right upwardly/downwardly extending portions 34.

A front center upper cover 43, which makes up the body cover 21, is disposed between the left and right front mudguards 26, and a rear center upper cover 49, which makes up the body cover 21, is disposed between the left and right rear mudguards 28 and behind the seat 16.

The front carrier 32 is disposed above the left and right front mudguards 26 and the front center upper cover 48 so as to straddle the left and right front mudguards 26 and the front center upper cover 48.

The front carrier 32 includes a pair of left and right side resting portions 51. Goods can be fixed by being rested on one or both of the left and right side resting portions 51 or being rested on the left and right side resting portions 51 so as to straddle them. The left and right side resting portions 51 are portions having a rectangular shape in a plan view, which are transversely disposed above the front mudguards 26 and the front center upper cover 48.

The rear carrier 33 is disposed above the left and right rear mudguards 28 and the rear center upper cover 49 so as to straddle the left and right rear mudguards 28 and the rear center upper cover 49.

The rear carrier 33 includes a pair of left and right side resting portions 53. Goods can be fixed by being rested on one or both of the left and right side resting portions 53 or being rested on the left and right side resting portions 53 so as to straddle them. The left and right side resting portions 53 are portions having a rectangular shape in a plan view, which are transversely disposed above the rear mudguards 28 and the rear center upper cover 49.

A rear end portion of the rear carrier 33 is attached to a rear bumper 55 which is supported on the body frame 11.

Figure 4:
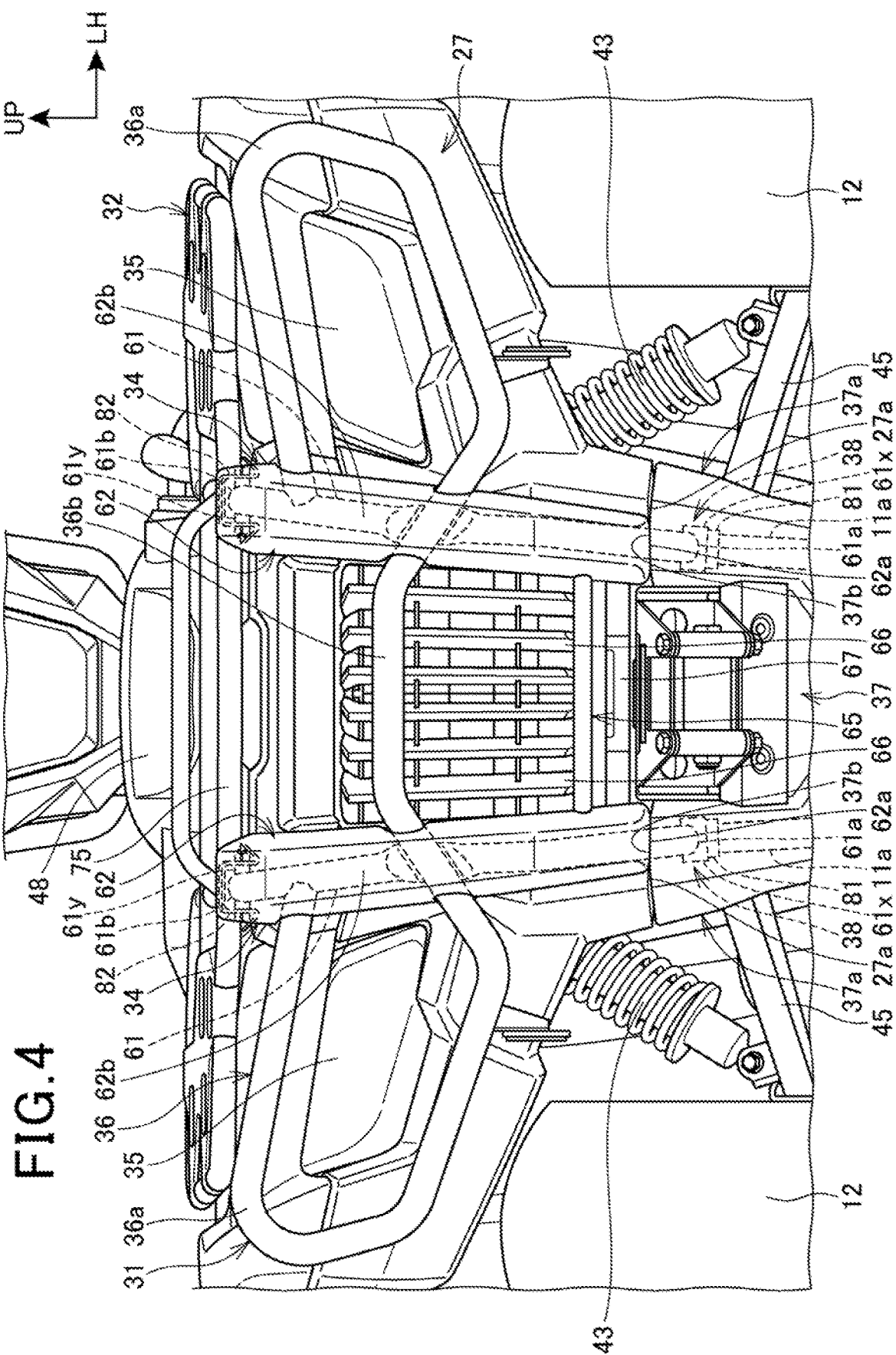
FIG. 4 is a front view illustrating a front bumper and a periphery thereof.
Figure 5:
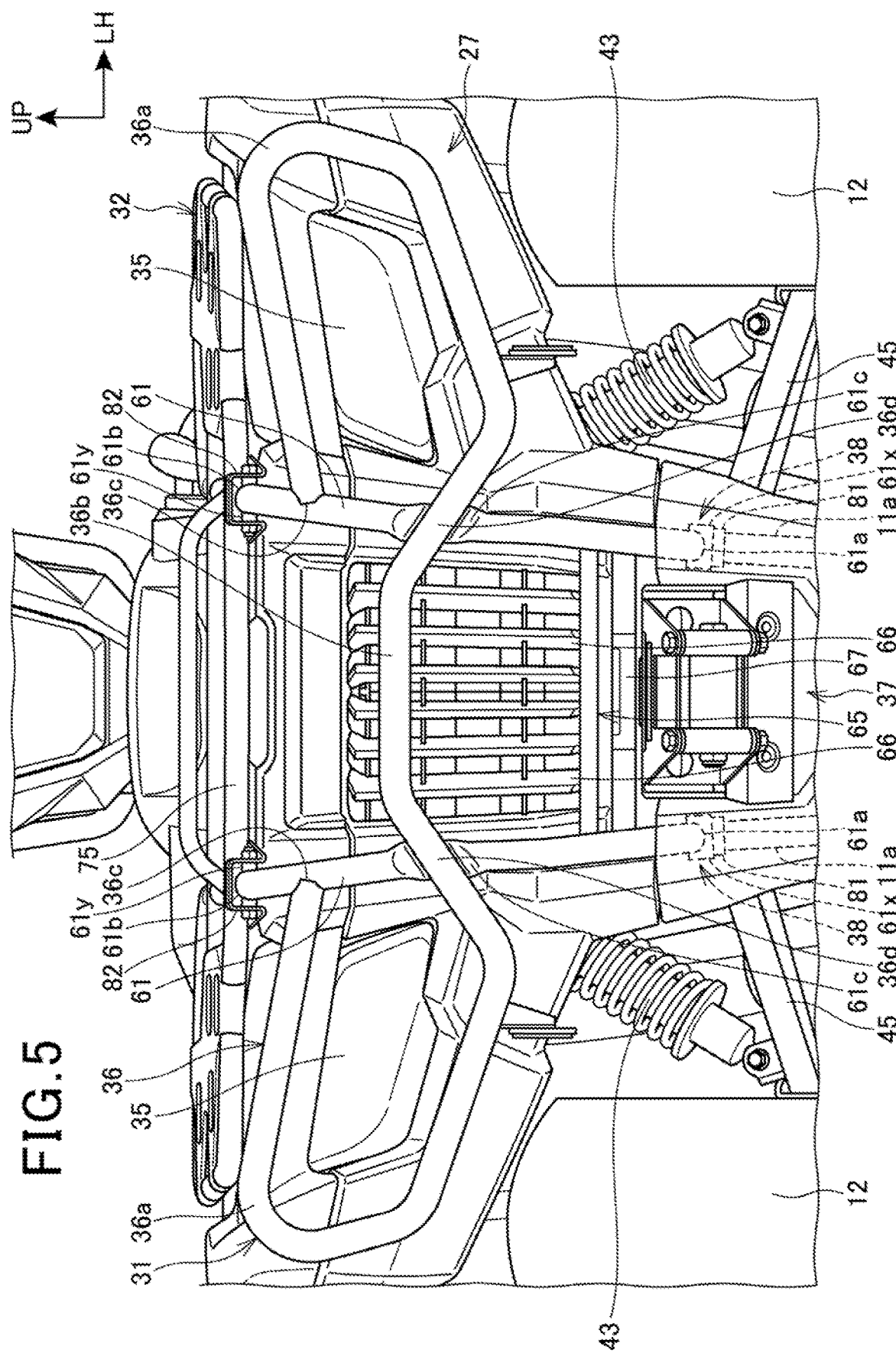
FIG. 5 is a front view illustrating a state where bumper main portions are removed from FIG. 4.
Figure 6:
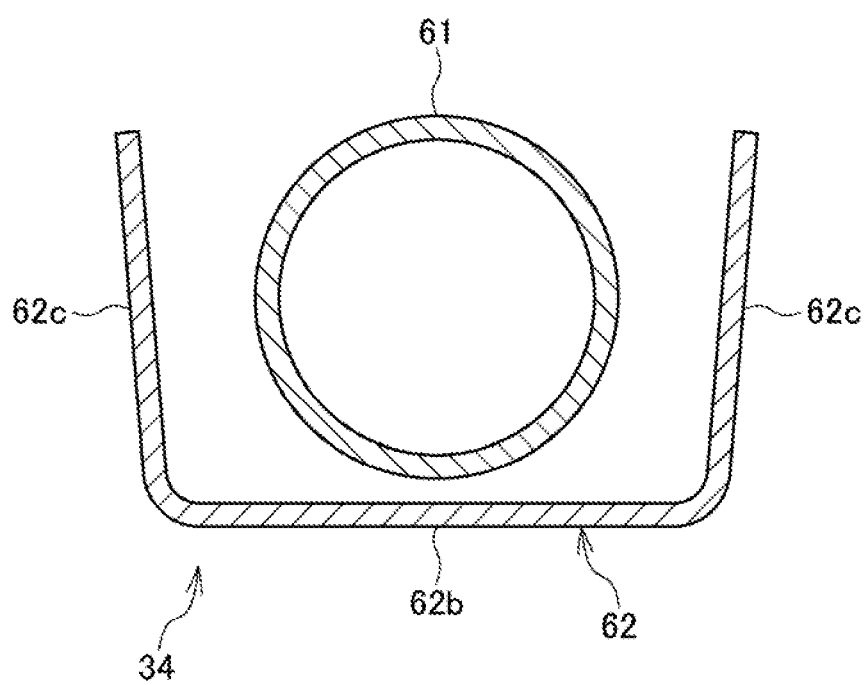
FIG. 6 is a sectional view taken along a line VI-VI in FIG. 4.

FIG. 4 is a front view illustrating the front bumper 31 and a periphery of the bumper. FIG. 5 is a front view illustrating a state where bumper main portions 62 are removed from FIG. 4. FIG. 6 is a sectional view taken along a line VI-VI in FIG. 4.

As illustrated in FIGS. 4 and 5, the left and right upwardly/downwardly extending portions 34 of the front bumper 31 are made up of a pair of left and right upwardly/downwardly extending frame portions 61 and the bumper main portions 62 configured to cover the pair of left and right upwardly/downwardly extending frame portions 61 from a front of the frame portions 61, respectively.

In the left and right upwardly/downwardly extending frame portions 61, lower end portions 61a are fastened detachably to lower portions (portions located behind the skid plate 37) of the body frame 11, and upper end portions 61b are fastened detachably to a front end portion of the front carrier 32. Specifically, connecting portions 61x are provided at the lower end portions 61a, and the connecting portions 61x are bolted detachably to connecting pieces 81 attached to the lower portions of the body frame 11. Additionally, connecting portions 61y are provided at the upper end portions 61b, and the connecting portions 61y are detachably bolted to connecting pieces 82 attached to the front end portion of the front carrier 32.

That is, the front bumper 31 can be attached to and detached from the body frame 11.

The left and right upwardly/downwardly extending portions 34 (specifically, the left and right upwardly/downwardly extending frame portions 61 and the left and right bumper main portions 62) are gradually spaced apart, from each other transversely outwards toward the upper part.

The left and right bumper main portions 62 are plate-shaped members that are fixed to the transversely extending portion 36 through welding. The width in the vehicle's width direction of the single bumper main portion 62 is gradually increased toward the upper part. The bumper main portions 62 are made of steel. However, the bumper main portions 62 may be made of resin.

The left, and right bumper main portions 62 cover the upper end portions 61b of the corresponding upwardly/downwardly extending frame portions 61 connected to the front carrier 32 from a front thereof.

The transversely extending portion 36 is made up of a single bent tube and includes laterally directed U-shaped lamp surrounding frame portions 36a, which are disposed on the peripheries of the left, and right headlamps 35 when seen from; the front of the bumper to protect the headlamps 35 from the front of the vehicle, and a cross frame portion 36b configured to connect the left and right lamp surrounding frame portions 36a together.

The transversely extending portion 36 is mounted so as to extend across the left and right upwardly/downwardly extending frame portions 61.

Upper inner end portions 36c of the lamp surrounding frame portions 36a are brought into abutment with upper side portions of the upwardly/downwardly extending frame portions 61 and are fixed thereto through welding. Connecting portions 36d between the lamp surrounding frame portions 36a and the cross frame portion 36b are fixed through welding to compressed portions 61c which are formed by depressing relevant portions of the upwardly/downwardly extending frame portions 61 in a front-rear direction.

A radiator grille 65 provided on the front cover 27 is disposed between the left and right upwardly/downwardly extending frame portions 61, when seen from the front of the bumper, and behind the left and right upwardly/downwardly extending frame portions 61.

The radiator grille 65 includes a plurality of vertically extending louvers 66. A radiator 67 is disposed behind the radiator grille 65.

A pair of left and right lower end portions 27a formed at left and right sides of the front cover 27 so as to project downwards and the lower end portions 62a of the bumper main portions 62 and respective upper end portions 37b of extending portions 37a formed at left and right sides of the skid plate 37 so as to project upwards face so as to continue in the up-down direction.

The left and right extending portions 37a of the skid plate 37 cover the connecting pieces 81 attached to a pair of left and right frame members 11a of the body frame 11 and the connecting portions 61x provided at the lower end portions 61a of the upwardly/downwardly extending frame portions 61 from the front of the vehicle.

The left and right frame members 11a of the body frame 11 and the left and right connecting pieces 81 described above make up a pair of left and right bumper lower portion support portions 38 configured to support a lower portion of the front bumper 31.

As illustrated in FIG. 6, the upwardly/downwardly extending frame portions 61 are each made up of a round tube. The bumper main portion 62 is a member configured to cover the corresponding upwardly/downwardly extending frame portion 61 from the front of the vehicle and both sides in the vehicle's width direction. The bumper main portion 62 is made up of a front wall 62b and left and right, side walls 62c and hence has a U-shaped cross section.

The front wall 62b is formed flat, and the left and right side walls 62c are formed so as to move away from each other transversely outwards as they extend toward a rear of the vehicle.

In addition, the front wall 62b is configured to increase its width in the vehicle's width direction gradually toward the upper part, as illustrated in FIG. 4.

Figure 7:
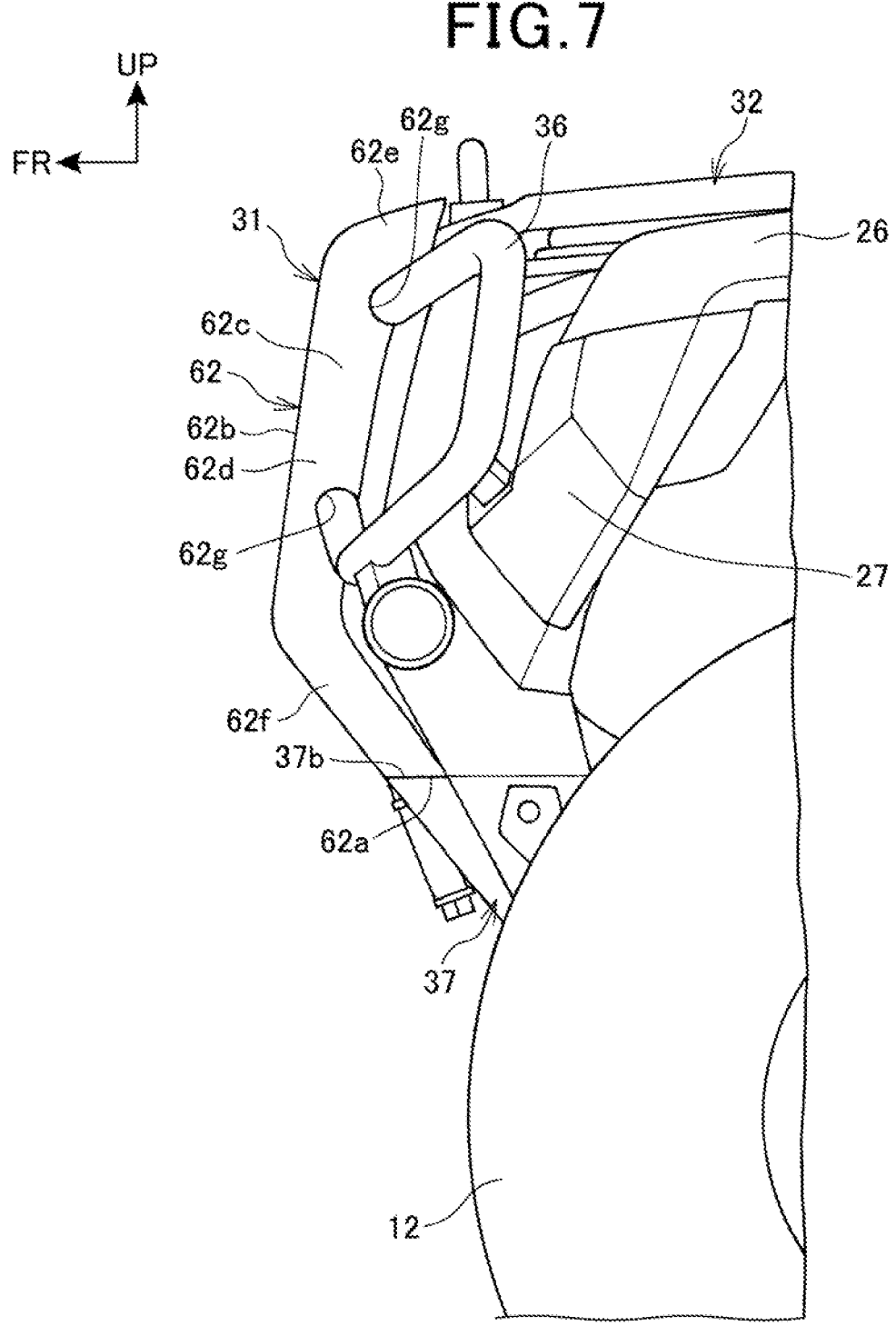
FIG. 7 is a left side view illustrating the front bumper and the periphery thereof.

FIG. 7 is a left side view illustrating the front bumper 31 and a periphery thereof.

The bumper main portion 62 of the front bumper 31 is made up of an upwardly/downwardly rising portion 62d extending in the up-down direction, an upper inclined portion 62e extending obliquely upwards toward the rear of the vehicle from an upper end of the upwardly/downwardly rising portion 62d, and a lower inclined portion 62f extending obliquely downwards toward the rear of the vehicle from a lower end of the upwardly/downwardly rising portion 62d.

Left and right side walls 62c of the upwardly/downwardly rising portion 62d include a plurality of notches 62g through which the transversely extending portion 36 is passed.

A lower end portion 62a of the lower inclined portion 62f and the upper end portion 37b of the skid plate 37 are disposed flush with each other.

In this way, the lower end portion 62a of the lower inclined portion 62f and the upper end portion 37b of the skid plate 37 are made flush with each other, whereby the bumper main portion 62 and the skid plate 37 are allowed to appear as being integrated into one unit, thereby making it possible to improve the external appearance of the front portion of the body.

Figure 8:
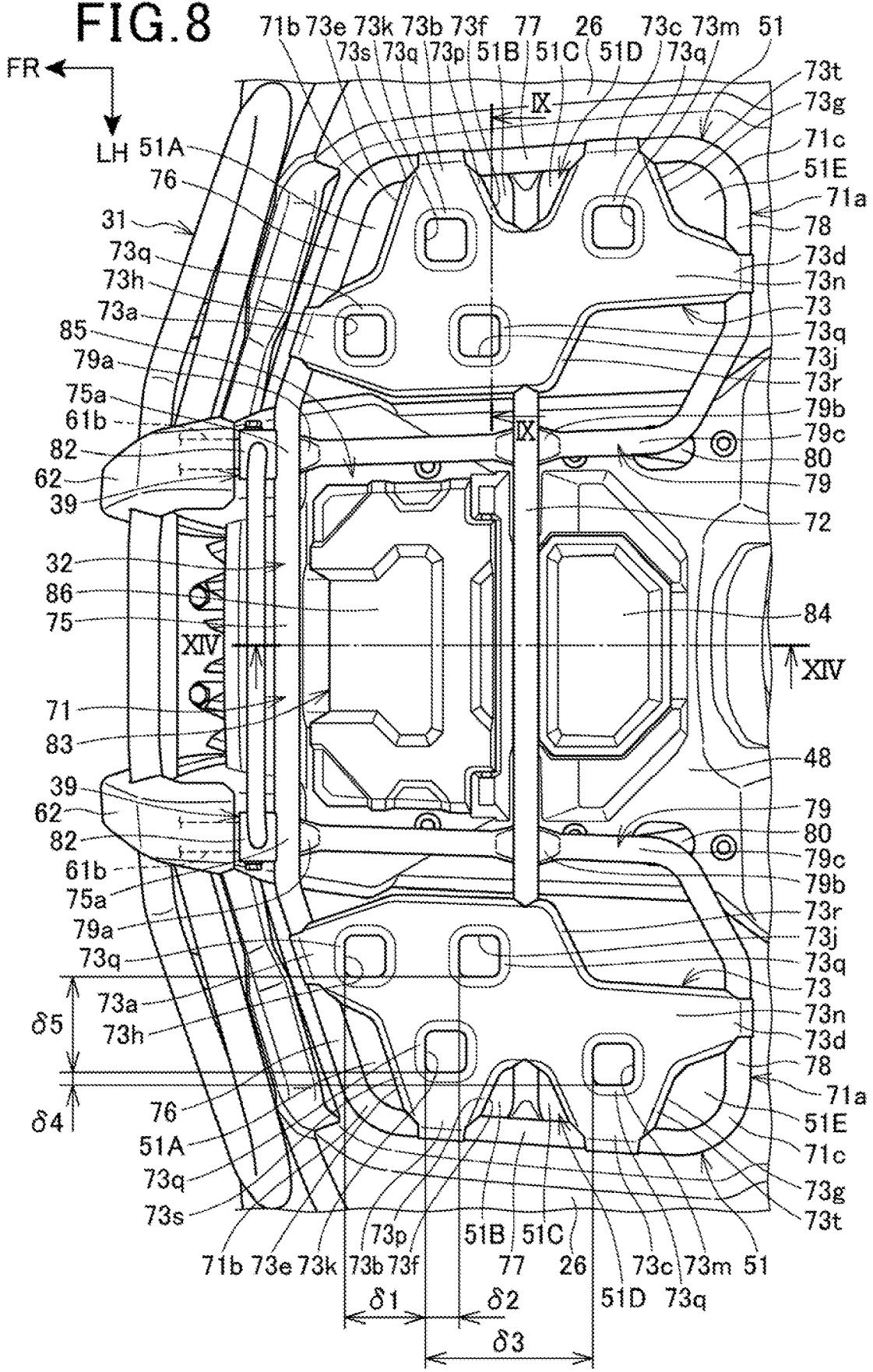
FIG. 8 is a plan view illustrating a front carrier and a periphery thereof.

FIG. 8 is a plan view illustrating the front carrier 32 and a periphery thereof.

The front carrier 32 includes a loop frame portion 71 made up of a single tube frame including loop-shaped loop portions 71a at a left and right thereof, a cross member 72 extending in the vehicle's width direction so as to straddle the left and right loop portions 71a, and resting plates 73 attached to the left and right loop portions 71a.

The loop frame portion 71 is made up of a front, cross member portion 75, a pair of left, and right front inclined frame portions 76, a pair of left and right rearward extending frame portions 77, a pair of left and right inwardly extending frame portions 78, and a pair of left and right forward extending frame portions 79.

The front cross member portion 75 is disposed ahead of the cross member 72 so as to extend in the vehicle's width direction. The left and right front inclined frame portions 76 extends transversely outwards obliquely toward the rear from both end portions of the front cross member portion 75. The left and right rearward extending frame portions 77 extend toward the rear from distal ends of the left and right front inclined frame portion 76. Both end portions of the cross member 72 are attached to the left, and right rearward extending frame portions 77.

The left and right inwardly extending frame portion 78 extend transversely inwards and transversely inwards obliquely toward the front of the vehicle from the left and right rearward extending frame portions 77. The left and right forward extending frame portions 79 extend toward the front of the vehicle from inner ends of the inwardly extending frame portions 78.

Front end portions 79a of the forward extending frame portions 79 are collapsed into a flat-plate shape to be attached to the front cross member portion 75 and projected to the front of the vehicle more than the front cross member portion 75. Rear end portions 79c of the forward extending frame portions 79 are attached to upper ends of frame members 80 which extend from the body frame 11 (refer to FIG. 1) below the front center upper cover 48.

Left and right end portions 75a of the front cross member portion 75 are fixed to front end portions 79a of the left and right forward extending frame portions 79 through welding and projected further transversely outwards than the forward extending frame portions 79 to be connected to the front inclined frame portions 76.

Connecting pieces 82 are attached to the front cross member portion 75 and the front end portions 79a of the left and right forward extending frame portions 79, and the connecting portions 61y of the left and right upwardly/downwardly extending frame portions 61 of the front bumper 31 shown in FIG. 4 are bolted to the left and right connecting pieces 82.

Returning to FIG. 8, the loop frame portions 71 and the left and right connecting pieces 82 described above make up a pair of left and right bumper upper portion support portion 39 supporting the upper portion of the front bumper 31.

The left and right forward extending frame portions 79 are collapsed at their middle portions to form compressed portions 79b, and the cross member 72 is fixed to the left and right compressed portions 79b and the left and right rearward extending frame portions 77 through welding.

The loop portions 71a each include both end portions 75a of the front cross member portion 75, the front inclined frame portion 76, the rearward extending frame portion 77, the inwardly extending frame portion 78, and the forward extending frame portion 79.

The resting plates 73 are each formed by bending and making holes in a flat plate and are attached to the front inclined frame portions 76, the rearward extending frame portions 77, the inwardly extending frame portions 78 and the cross member 72.

The resting plates 73 each include a plurality of arm portions 73a, 73b, 73c, 73d, cut-out portions 73e, 73f, 73g which are formed between these arm portions 73a, 73b, 73c, 73d, and a plurality of mounting holes 73h, 73j, 73k, 73m. Various types of attachments capable of fixing, holding and accommodating goods are detachably locked on edge portions of the plurality of mounting holes 73h, 73j, 73k, 73m.

Here, one mounting hole 73k is set as a reference hole. The mounting hole 73h is offset forwards by δ1 with respect to the mounting hole 73k, the mounting hole 73j is offset rearwards by 52 with respect to the mounting hole 73k, and the mounting hole 73m is offset rearwards by δ3 with respect to the mounting hole 73k.

In addition, the mounting hole 73m is offset transversely outwards by 54 with respect to the mounting hole 73k, and the mounting holes 73h, 73j are offset transversely inwards by 55 with respect to the mounting hole 73k.

In this way, a mounting position (a mounting direction) of an attachment having a plurality of mounting portions can be determined by disposing the mounting holes 73h, 73j, 73k, 73m in such a way that the positions of these mounting holes are offset from one another, thereby making it possible to increase the degree of freedom of a mounting position of an attachment having only one mounting portion.

The arm portion 72a is attached to the front inclined frame portion 76, and the arm potions 73b, 73c are attached to the rearward extending frame portion 77, and the arm portion 73d is attached to the inwardly extending frame portion 78.

The cut-out portion 73e is formed inside a corner portion 71b formed by the front inclined frame portion 76 and the rearward extending frame portion 77. The cut-out portion 73e, the front inclined frame portion 76 and the rearward extending frame portion 77 form a closed space 51A.

The cut-out portion 73f is formed inside the rearward extending frame portion 77. The cut-out portion 73f, the cross member 72 and the rearward extending frame portion 77 form a pair of closed spaces 51B, 51C on both sides of the cross member 72. The pair of spaces 513, 51C forms a space 51D.

The cut-out portion 73g is formed inside a corner portion 71c formed by the rearward extending frame portion 77 and the inwardly extending frame portion 78. The cut-out portion 73g, the rearward extending frame portion 77 and the inwardly extending frame portion 78 form a closed space 51E.

An end portion of the cross member 72 is disposed inside the cut-out portion 73f.

The loop portion 71a can easily be gripped by providing the cut-out portions 73e, 73g described above inside the corner portions 71b, 71c. For example, when the vehicle is caught in a muddy road, the rider can grip on the corner portions 71b, 71c of the front carrier 32 by his or her hands to push or pull out the vehicle from the mud.

The mounting holes 73h, 73j are formed so as to be spaced apart from each other in the front-rear direction of the vehicle with the mounting hole 73h placed ahead of the mounting hole 73j. The mounting holes 73k, 73m are formed so as to be spaced apart from each other in the front-rear direction of the vehicle with the mounting hole 73k placed ahead of the mounting hole 73m and are disposed further transversely outwards than the mounting holes 73h, 73j. The mounting hole 73h and the mounting holes 73k, 73j, 73m are disposed in order from the front in the front-rear direction.

The cut-out portion 73f is disposed between the mounting holes 73k, 73m.

The loop portion 71a, the resting plate 73 and part of the cross member 72 described above (a portion located further transversely outwards than the forward extending frame portion 79) make up the side resting portion 51.

The cross member 72 is disposed to extend between the left and right side resting portions 51.

A distance in the front-rear direction from a front end of the front cross member portion 75 to a rear end of the cross member 72 is shorter than a longitudinal width of the side resting portion 51.

The storage portion 83 and the maintenance lid 84 disposed behind the storage portion 83 are provided in the front center upper cover 48 below the front carrier 32 and between the left and right side resting portions 51 when seen from above.

The storage portion 83 is disposed between the left and right forward extending frame, portions 79 and between the cross member 72 and the front cross member portion 75 when seen from above. Additionally, the storage portion 83 is disposed between the left and right side resting portions 51. That is, when seen from above, the storage portion 83 is disposed within a space 85 surrounded by a grid made up of the left and right forward extending frame portions 79, the cross member 72 and the front cross member portion 75 of the front carrier 32.

The maintenance lid 84 is disposed between the left and right forward extending frame portions 79 and below and rearwards of the cross member 72 when seen from above. The storage portion 33 includes a storage portion lid 86 that can be opened and closed.

Figure 9:
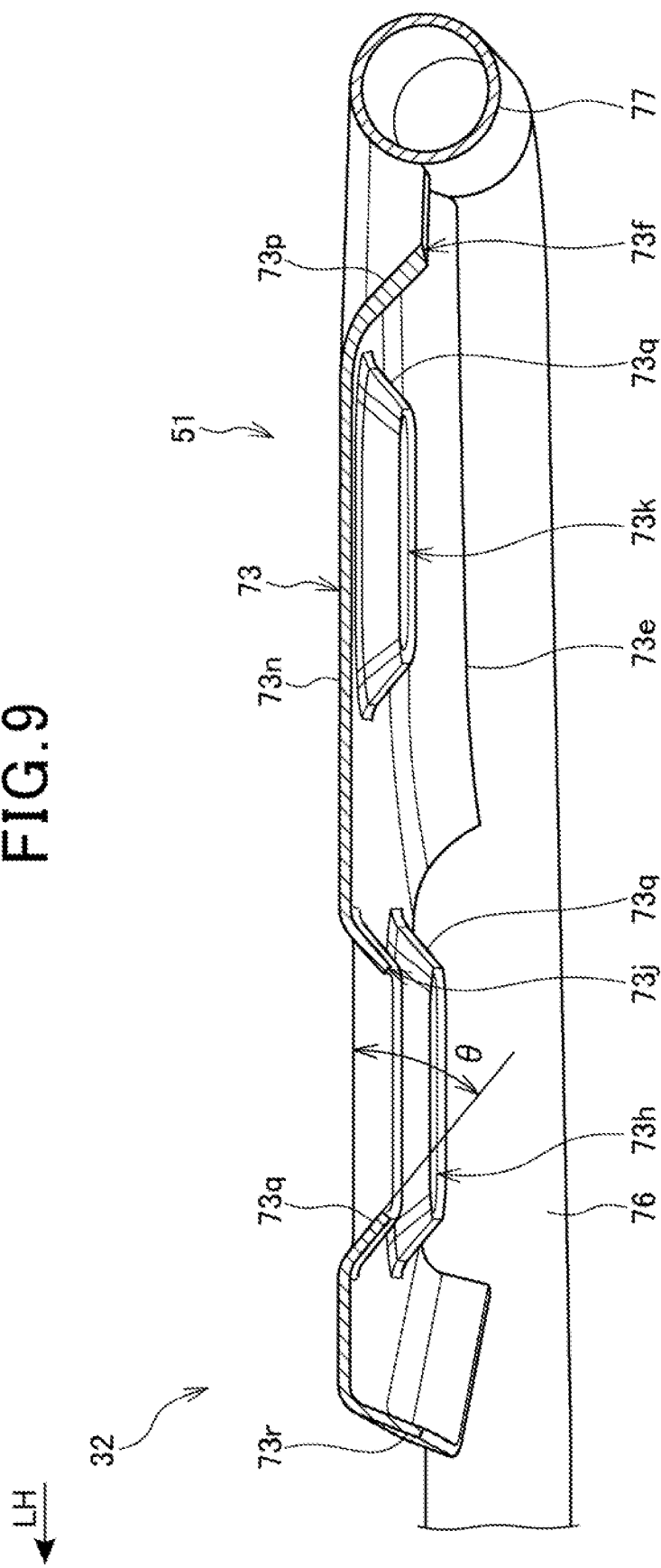
FIG. 9 is a sectional view of the front carrier.

FIG. 9 is a drawing illustrating a section of the front carrier 32 taken along a line IX-IX shown in FIG. 8 and as seen obliquely from a position below.

The resting plates 73 each include a flat plate portion 73n, a cut-out portion inclined portion 73p, a mounting hole inclined portion 73q and a circumferential edge portion inclined portion 73r.

The flat plate portion 73n is a portion formed flat. The cut-out portion inclined portion 73p and the circumferential edge portion inclined portion 73r are formed on an outer circumferential portion of the flat plate portion 73n. Additionally, the mounting hole inclined portion 73q is formed on circumferential edge portions of the cut-out portions 73e, 73f, 73g which are formed in the flat plate portion 73n.

In FIGS. 8 and 9, the cut-out portion inclined portion 73p is a portion formed on an edge portion of the cut-out portion 73f by being bent so as to be inclined downwards from the flat plate portion 73n. As with the edge portion of the cut-out portion 73f, cut-out portion inclined portions 73s, 73t are formed on edge portions of the cut-out portions 73e, 73g by being bent so as to be inclined downwards from the flat plate portion 73n.

The cut-out portion inclined portions 73p, 73s, 73t described above have the same or substantially the same inclined angle.

The mounting hole inclined portion 73q is a portion that is bent downwards at an inner circumferential edge portion of the mounting hole 73j so as to be inclined from the flat plate portion 73n and is inclined at an angle θ relative to the flat plate portion 73n. The inclination angle θ is set at 30°≤θ≤50°, for example.

Mounting hole inclined portions 73q are formed also at inner circumferential edge portions of the mounting holes 73h, 73k, 73m, as done at the edge portion of the mounting hole 73j, and these mounting hole inclined portions 73q are also bent downwards so as to be inclined from the flat plate portion 73n.

The circumferential edge portion inclined portion 73r is a portion that is bent downwards at an inner edge portion of the flat plate portion 73n so as to be inclined from the flat plate portion 73n. Specifically, the circumferential edge portion inclined portion 73r is formed at a portion of an inner edge portion of the resting plate 73 which lies from the front inclined frame portion 76 to the inwardly extending frame portion 78 and includes inner edge portions of the arm portions 73a, 73d.

The resting plate 73 is pressed so that the cut-out portion inclined portions 73p, 73s, 73t, the mounting hole inclined portions 73*q* and the circumferential edge portion inclined portion 73*r* described above are formed.

An inclination angle of the circumferential edge portion inclined portion 73*r* relative to the flat plate portion 73*n* is greater than the angle θ.

As described above, the rigidity of the resting plate 73 can be enhanced by forming the cut-out portion inclined portions 73*p*, 73*s*, 73*t*, the mounting hole inclined portions 73*q* and the circumferential edge portion inclined portion 73*r* on the resting plate 73. Additionally, the supporting rigidity of an attachment can be improved when the attachment is attached to the edge portions of the mounting holes 73*h*, 73*j*, 73*k*, 73*m* by providing the mounting hole inclined portions 73*q*.

Figure 10:
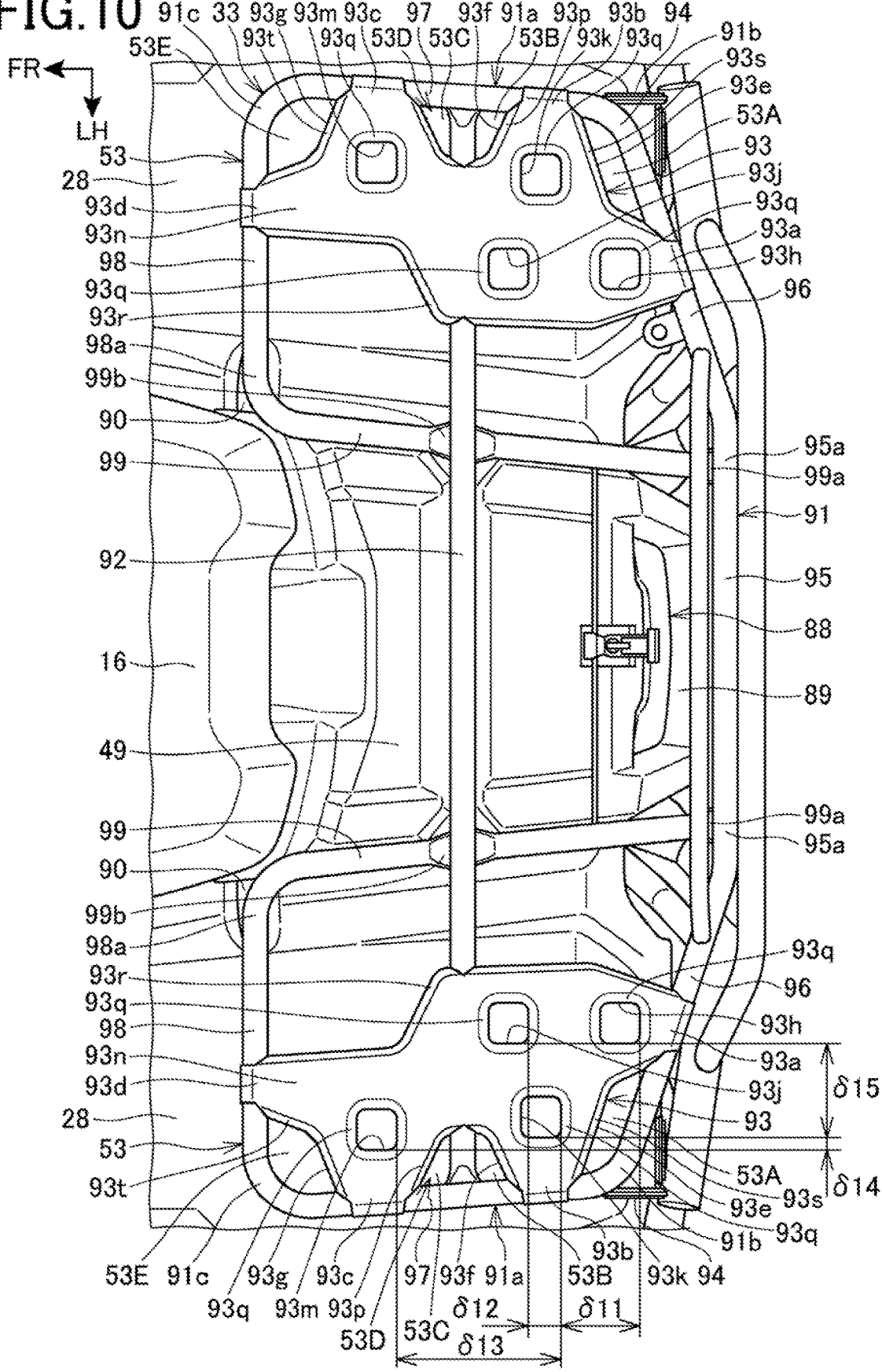
FIG. 10 is a plan view illustrating a rear carrier and a periphery thereof.

FIG. 10 is a plan view illustrating the rear carrier 33 and a periphery thereof.

The rear carrier 33 includes a loop frame portion 91 made up of a single tube frame including loop-shaped loop portions 91*a* at the left and right thereof, a cross member 92 extending across the left and right loop portions 91*a* in the vehicle's width direction, and resting plates 93 attached to the left and right loop portions 91*a*.

The loop frame portion 91 is made up of a rear cross member portion 95, a pair of left and right rear inclined frame portions 96, a pair of left and right, forward extending frame portion 97, a pair of left and right inwardly extending frame portion 98, and a pair of left and right rearward extending frame portion 99.

The rear cross member portion 95 is disposed behind the cross member 92 so as to extend in the vehicle's width direction. The left and right rear inclined frame portions 96 extend transversely outwards obliquely toward the front from both end portions of the rear cross member portion 95. The left and right, forward extending frame portion 97 extend to the rear from distal ends of the left and right rear inclined frame portions 96. Both end portions of the cross member 92 are attached to the left and right forward extending frame portions 97.

The left and right inwardly extending frame portions 93 extend transversely inwards from the left and right forward extending frame portions 97. The left and right, rearward extending frame portions 99 extend toward the rear of the vehicle from inner ends of the inwardly extending frame portions 98.

Rear end portions 99*a* of the rearward extending frame portions 99 are collapsed into a flat-plate shape to be attached to the rear cross member portion 95. Inner end portions 98*a* of the inwardly extending frame portions 98 are attached to the rear center upper cover 49 and upper ends of frame members 90 extending from the body frame 11 (refer to FIG. 1) below the left and right rear mudguards 28.

Left and right end portions 95*a* of the rear cross member portion 95 are fixed to rear end portions 99*a* of the left and right rearward extending frame portions 99 through welding.

A rear bumper 55 is connected to corner portions 91*b* between the rear inclined frame portions 96 and the forward extending frame portions 97 via connecting members 94.

The left and right rearward extending frame portions 99 are collapsed at middle portions to form compressed portions 99*b*, and the cross member 92 is fixed to the left and right compressed portions 99*b* and the left and right forward extending frame portions 97 through welding.

The loop portions 91*a* are made up of the end portions 95*a* of the rear cross member portions 95, the rear inclined frame portions 96, the forward extending frame portions 97, the inwardly extending frame portions 98, and the rearward extending frame portions 99 described above.

The resting plates 93 are each formed by bending and making holes in a flat plate and are attached to the rear inclined frame portions 96, the forward extending frame portions 97, the inwardly extending frame portions 98 and the cross member 92.

The resting plates 93 each include a plurality of arm portions 93*a*, 93*b*, 93*c*, 93*d*, cut-out portions 93*e*, 93*f*, 93*g* which sire formed between these arm portions 93*a*, 93*b*, 93*c*, 93*d*, and a plurality of mounting holes 93*h*, 93*j*, 93*k*, 93*m*. Various types of attachments capable of fixing, holding and accommodating goods are detachably locked on edge portions of the plurality of mounting holes 93*h*, 93*j*, 93*k*, 93*m*.

Here, one mounting hole 93*k* is set as a reference hole. The mounting hole 93*h* is offset forwards by δ11 with respect to the mounting hole 93*k*, the mounting hole 93*j* is offset, rearwards by δ12 with respect to the mounting hole 93*k*, and the mounting hole 93*m* is offset forwards by δ13 with respect to the mounting hole 93*k*.

In addition, the mounting hole 93*m* is offset transversely outwards by δ14 with respect to the mounting hole 93*k*, and the mounting holes 93*h*, 93*j* are offset transversely inwards by δ15 with respect to the mounting hole 93*k*.

The arm portion 93*a* is attached to the rear inclined frame portion 96, and the arm potions 93*b*, 93*c* are attached to the forward extending frame portion 97, and the arm portion 93*d* is attached to the inwardly extending frame portion 98.

The cut-out portion 93*e* is formed inside a corner portion 91*b* formed by the rear inclined frame portion 96 and the forward extending frame portion 97. The cut-out portion 93*e*, the rear inclined frame portion 96 and the forward extending frame portion 97 form a closed space 53A.

The cut-out portion 93*f* is formed inside the forward extending frame portion 97. The cut-out portion 93*f*, the cross member 92 and the forward extending frame portion 97 form a pair of closed spaces 53B, 53C on both sides of the cross member 92. The pair of spaces 53B, 53C forms a space 53D.

The cut-out portion 93*g* is formed inside a corner portion 91*c* formed by the forward extending frame portion 97 and the inwardly extending frame portion 98. The cut-out portion 93*g*, the forward extending frame portion 97 and the inwardly extending frame portion 98 form a closed space 53E.

An end portion of the cross member 92 is disposed inside the cut-out portion 93*f*.

The loop portion 91*a* can easily be gripped by providing the cut-out portions 93*e*, 93*g* described above inside the corner portions 91*b*, 91*c*. For example, when the vehicle is caught in a muddy road, the rider can grip on the corner portions 91*b*, 91*c* of the rear carrier 33 by his or her hands to push or pull out the vehicle from the mud.

The mounting holes 93*h*, 93*j* are formed so as to be spaced apart from each other in the front-rear direction of the vehicle with the mounting hole 93*h* placed ahead of the mounting hole 93*j*. The mounting holes 93*k*, 93*m* are formed so as to be spaced apart, from each other in the front-rear direction of the vehicle with the mounting hole 93*k* placed ahead of the mounting hole 93*m* and are disposed further transversely outwards than the mounting holes 93*h*, 93*j*. The mounting hole 93*h* and the mounting holes 93*k*, 93*j*, 93*m* are disposed in order from the rear in the front-rear direction.

The cut-out portion 93*f* is disposed between the mounting holes 93*k*, 93*m*.

The loop portion 91*a*, the resting plate 93 and part of the cross member 92 described above (a portion located further transversely outwards than the rearward extending frame portion 99) make up the side resting portion 53.

The cross member 92 is disposed to extend between the left and right side resting portions 53.

A distance in the front-rear direction from a front end of the cross member 92 to a rear end of the rear cross member portion 95 is shorter than a longitudinal width of the side resting portion 53.

The resting plates 93 each include a flat plate portion 93n, cut-out portion inclined portions 93p, 93s, 93t, mounting hole inclined portions 93q and a circumferential edge portion inclined portion 93r.

The flat plate portion 93n is a portion formed flat. The cut-out portion inclined portions 93p, 93s, 93t and the circumferential edge portion inclined portion 93r are formed on an outer circumferential portion of the flat plate portion 93n. Additionally, the mounting hole inclined portions 93q are formed on circumferential edge portions of the cut-cut portions 93e, 93f, 93g which are formed in the flat plate portion 93n.

The cut-out portion inclined portions 93p, 93s, 93t are portions formed on edge portions of the cut-out portions 93f, 93e, 93g by being bent so as to be inclined downwards from the flat plate portion 93n.

The cut-out portion inclined portions 93p, 93s, 93t described above have the same or substantially the same inclined angle.

The mounting hole inclined portions 93q are portions that are bent downwards at inner circumferential edge portions of the mounting hole 93h, 93j, 93k, 93m so as to be inclined from the flat plate portion 93n and are inclined at an angle θ (refer to FIG. 9) relative to the flat plate portion 93n.

The circumferential edge portion inclined portion 93r is a portion that is bent downwards at an inner edge portion of the flat plate portion 93n so as to be inclined from the flat plate portion 93n. Specifically, the circumferential edge portion inclined portion 93r is formed at a portion of an inner edge portion of the resting plate 93 which lies from the rear inclined frame portion 96 to the inwardly extending frame portion 98 and includes inner edge portions of the arm portions 93a, 93d.

The resting plate 93 is pressed so that the cut-out portion inclined portions 93p, 93s, 93t, the mounting hole inclined portions 93q and the circumferential edge portion inclined portion 93r described above are formed.

An inclination angle of the circumferential edge portion inclined portion 93r relative to the flat plate portion 93n is greater than the angle θ.

As described above, the rigidity of the resting plate 93 can be enhanced by forming the cut-out portion inclined portions 93p, 93s, 93t, the mounting hole inclined portions 93q and the circumferential edge portion inclined portion 93r on the resting plate 93. Additionally, the supporting rigidity of an attachment can be improved when the attachment is attached to the edge portions of the mounting holes 93h, 93j, 93k, 93m by providing the mounting hole inclined portions 93q.

A storage portion 88 is provided below the rear carrier 33 and at the rear part of the rear center upper cover 49 between the left, and right side resting portions 53 when seen from above.

The storage portion 88 is disposed between the left and right rearward extending frame portions 99 and between the cross member 92 and the rear cross member portion 95 when seen from above. Additionally, the storage portion 88 is disposed between the left and right side resting portions 53.

The storage portion 88 includes a storage portion lid 89 that can be opened and closed.

Figure 11:
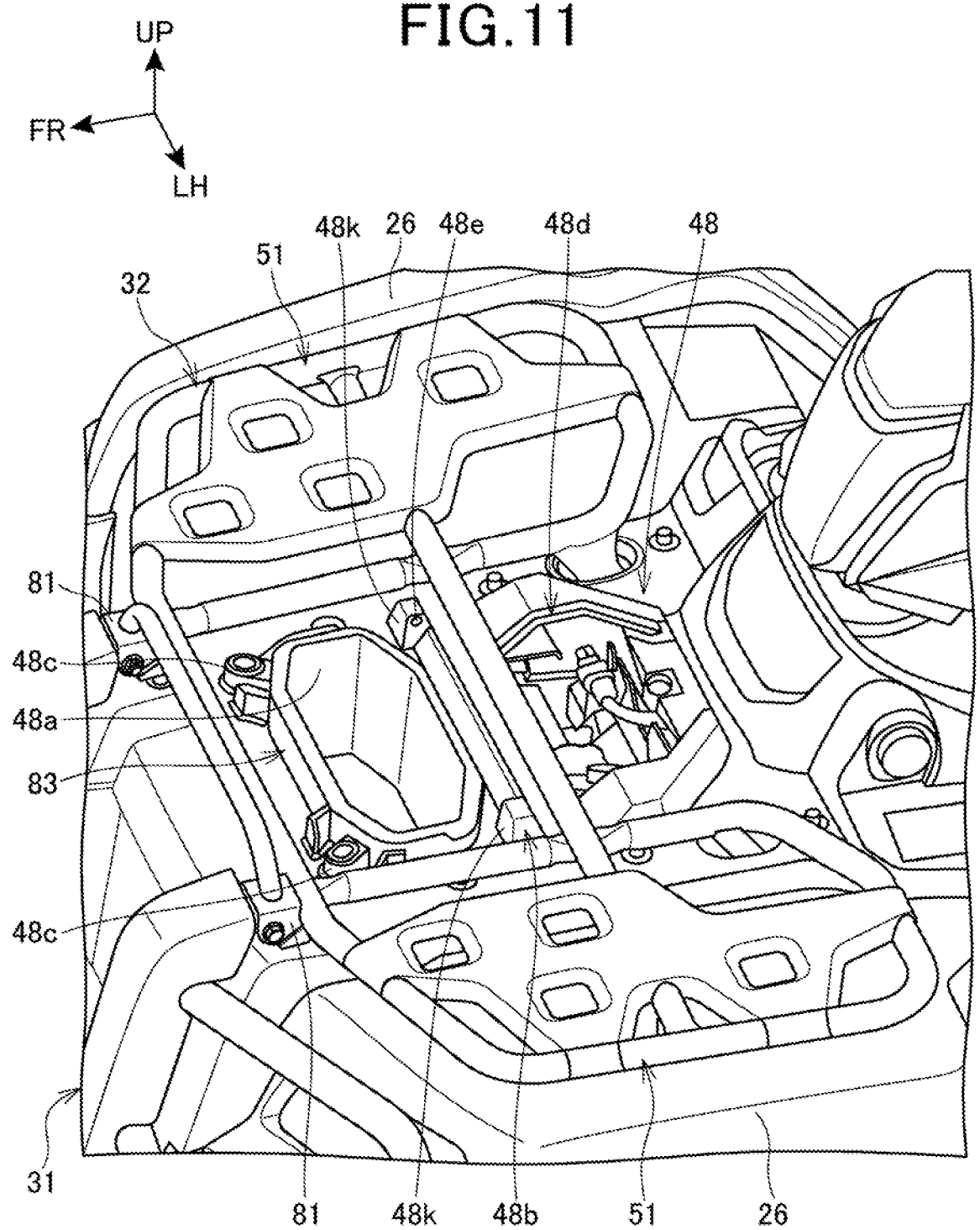
FIG. 11 is a perspective view illustrating a front portion of a body.

FIG. 11 is a perspective view illustrating the front portion of the vehicle.

In the figure, the storage portion lid 86 (refer to FIG. 8) of the storage portion 83 and the maintenance lid 84 (refer to FIG. 8) are removed.

The storage portion 83 is made up of a storage portion main body 48a, which is formed depressed integrally on the front center upper cover 48 for storing goods, and the storage portion lid 86 configured to cover the storage portion main body 48a from above. A lid support portion 48b is integrally provided behind the storage portion main body 48a on the front center upper cover 48 to swingably support a rear end portion of the storage portion lid 86.

The storage portion main body 48a has a pair of left and right lid lock portion 48c provided at a front side thereof to lock a front end portion of the storage portion lid 86.

A maintenance opening 48d is formed behind the storage portion on the front center upper cover 48, and this maintenance opening 48d is opened and closed by the maintenance lid 84.

A cooling system (for example, a radiator and a reservoir tank for the radiator, which will both be described later) of the power unit and various types of electrical parts are serviced for maintenance through the maintenance opening 48d.

Figure 12A:
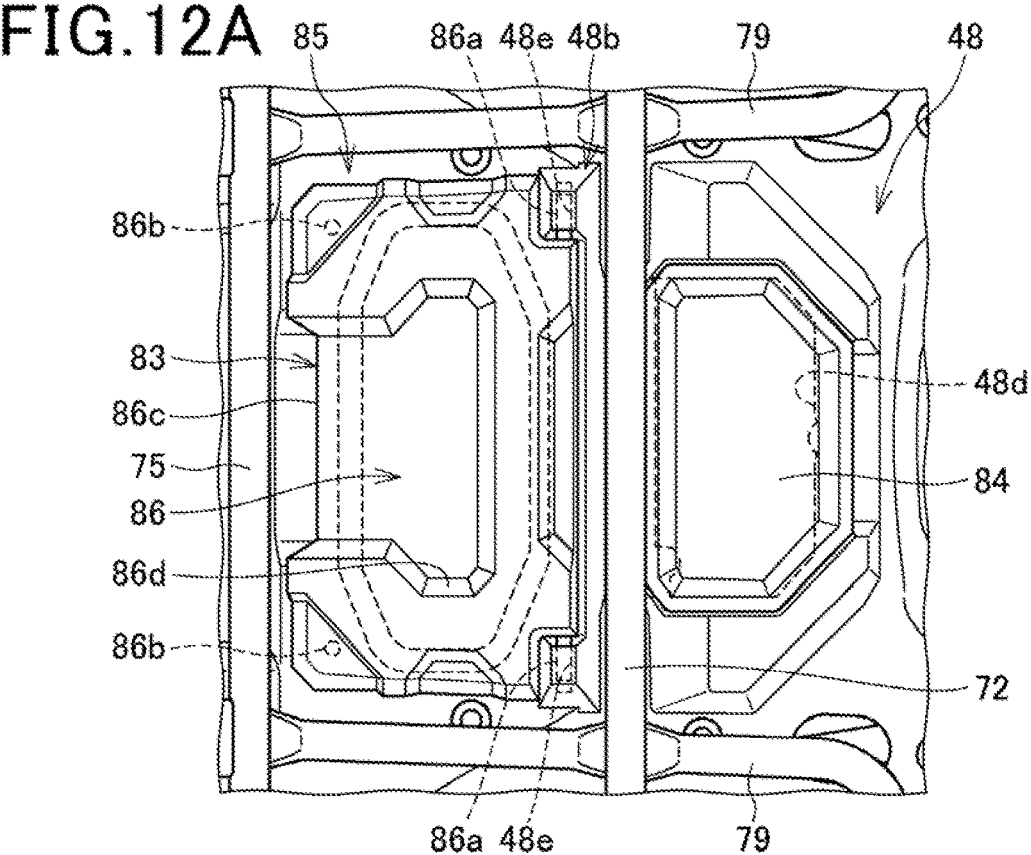
Figure 12B:
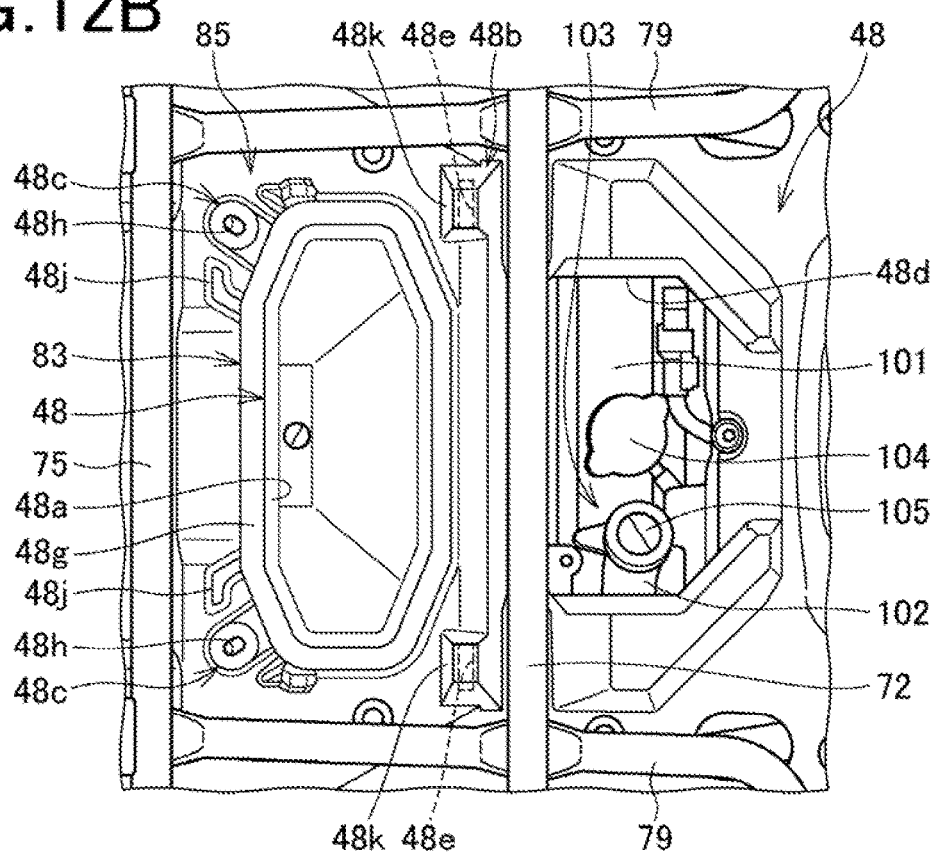

FIGS. 12A and 12B are plan views illustrating the storage portion 83 and the maintenance opening 48d in the front portion of the vehicle.

FIG. 12A is a view illustrating a state where the storage portion lid 86 and the maintenance lid 84 are closed, and FIG. 12B is a view illustrating a state where the storage portion lid 86 and the maintenance lid 84 are both removed.

As illustrated in FIG. 12A, the storage portion lid 86 has a rectangular shape when seen from above and includes a pair of left and right hinge shafts 86a provided at the left and right of the rear end portion, a pair left, and right lock portion 86b provided on a left and right lower surfaces of a front end portion, and a cut-out portion 86c; formed at a transversely central portion of a front edge.

The left and right hinge shafts 86a are rotatably inserted individually in a pair of left and right hinge shaft insertion holes 48e provided at both end portions of the lid support portion 48b. The storage portion lid 86 can be opened from and closed to the storage portion main body 48a by fitting the left and right, hinge shafts 86a in the corresponding hinge shaft insertion holes 48e.

The left and right lock portions 86b are locked individually at left, and right lid lock portion 48c; (refer to FIG. 12B) of the storage portion main body 48a.

The cut-out portion 86c is formed so as to continue to a front end portion of a recessed portion 86d formed on an upper surface of the storage portion lid 86. The cut-out portion 86c is disposed in a position that can be reached by the rider when the rider stands up from a riding position where the rider sits on the seat 16 (refer to FIG. 1) and stretches his or her arm. This enables the rider to put his or her hand on the cut-out portion 86c while standing up from the seat 16 to open or close the storage portion lid 86. The storage portion lid 86 can be attached to and detached from the lid support portion 48b.

The maintenance lid 84 is formed into a shape in which a width in the vehicle's width direction of a rear portion is gradually narrowed as it extends toward the rear. A front end portion of the maintenance lid 84 is swingably supported on the front center upper cover 48, and a rear end portion is locked on the front center upper cover 48. The maintenance lid 84 can be attached to and detached from the front center upper cover 48.

As illustrated in FIG. 12B, the recessed storage portion main body 48a of the storage portion 83 has an opening 48f having a contour of the shape of a deformed octagon which is elongated in the vehicle's width direction when seen from above. A pair of left and right lid lock portions 48c are formed at a front side of an edge portion 48g of the storage portion main body 48a so as to extend from the edge portion 48g, and a lid lock hole 48h is opened in each of the left and right lid lock portions 48c. The left and right lock portions 86b of the storage portion lid 86 are inserted individually in the corresponding left and right lid lock holes 48h to be locked therein.

A pair of left and right reinforcement ribs 48j are formed on transversely inner sides of the left and right lid lock portions 48c so as to extend to a front side from the edge portion 48g, whereby the storage portion 83 is reinforced by the reinforcement ribs 48j.

The lid support portion 48b is formed at the rear of the edge portion 48g of the storage portion 83 so as to extend in the vehicle's width direction. Hinge shaft support portions 48k are formed ahead of both end portions of the lid support portions 48b so as to project to the front, and hinge shaft insertion holes 48e are opened individually in the left and right hinge shaft, support portions 48k so as to extend in the vehicle's width direction.

A radiator 101 and a reservoir tank 102 connected to the radiator 101 by way of a hose are disposed below the maintenance opening 48d, and the radiator 101 and the reservoir tank 102 can be confirmed visually from the maintenance opening 43d. The radiator 101 and the reservoir tank 102 described above make up an engine cooling part 103.

The radiator 101 includes a radiator cap 104 configured to close its fluid inlet port. The reservoir tank 102 includes a cap 105 configured to close its fluid inlet port. Both the radiator cap 104 and the cap 5 can be confirmed visually from the maintenance opening 48d.

Figure 13:
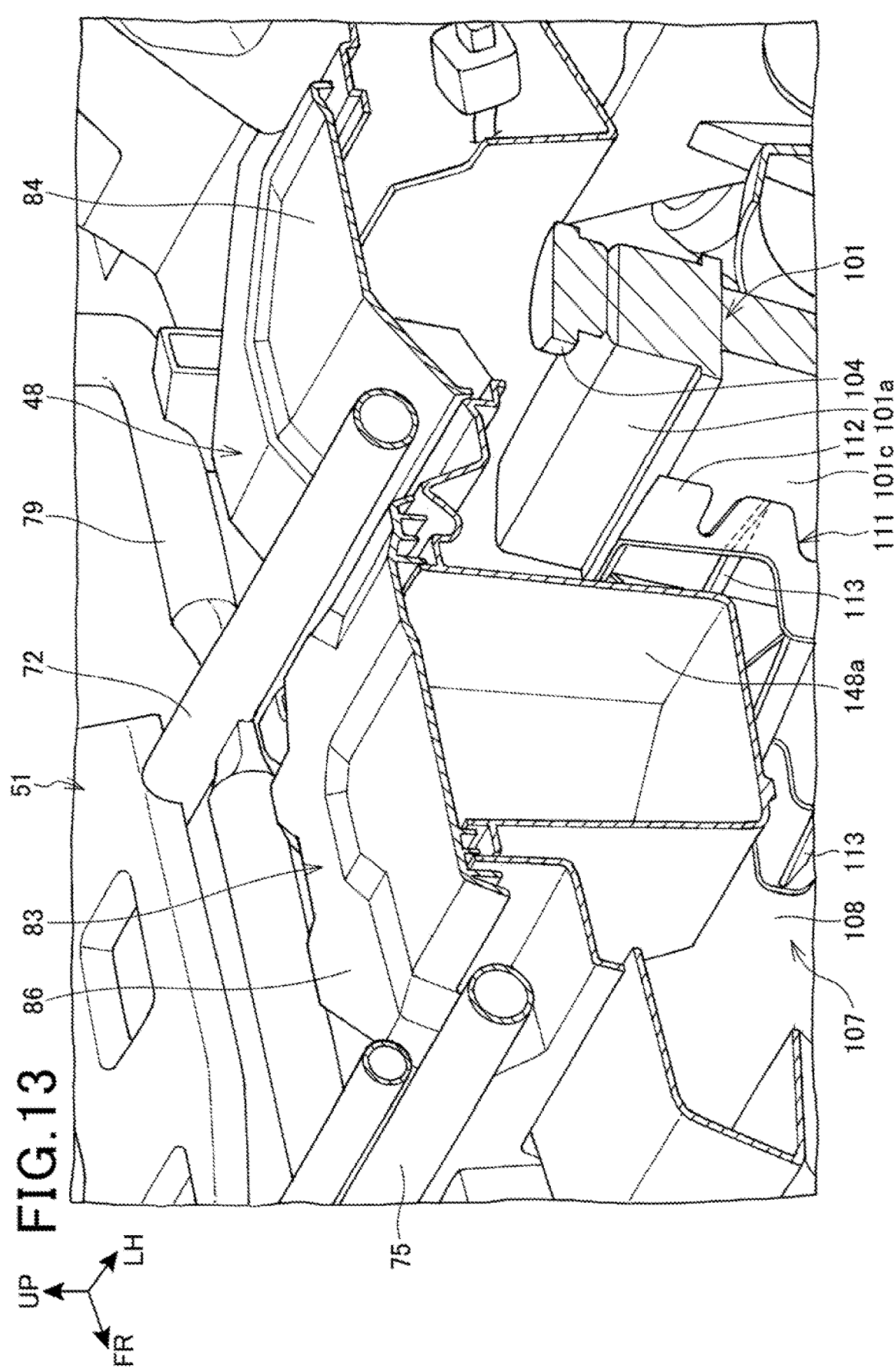
FIG. 13 is a perspective view of a section taken along a line XIV-XIV in FIG. 8 as seen obliquely from a front upper position.
Figure 14:
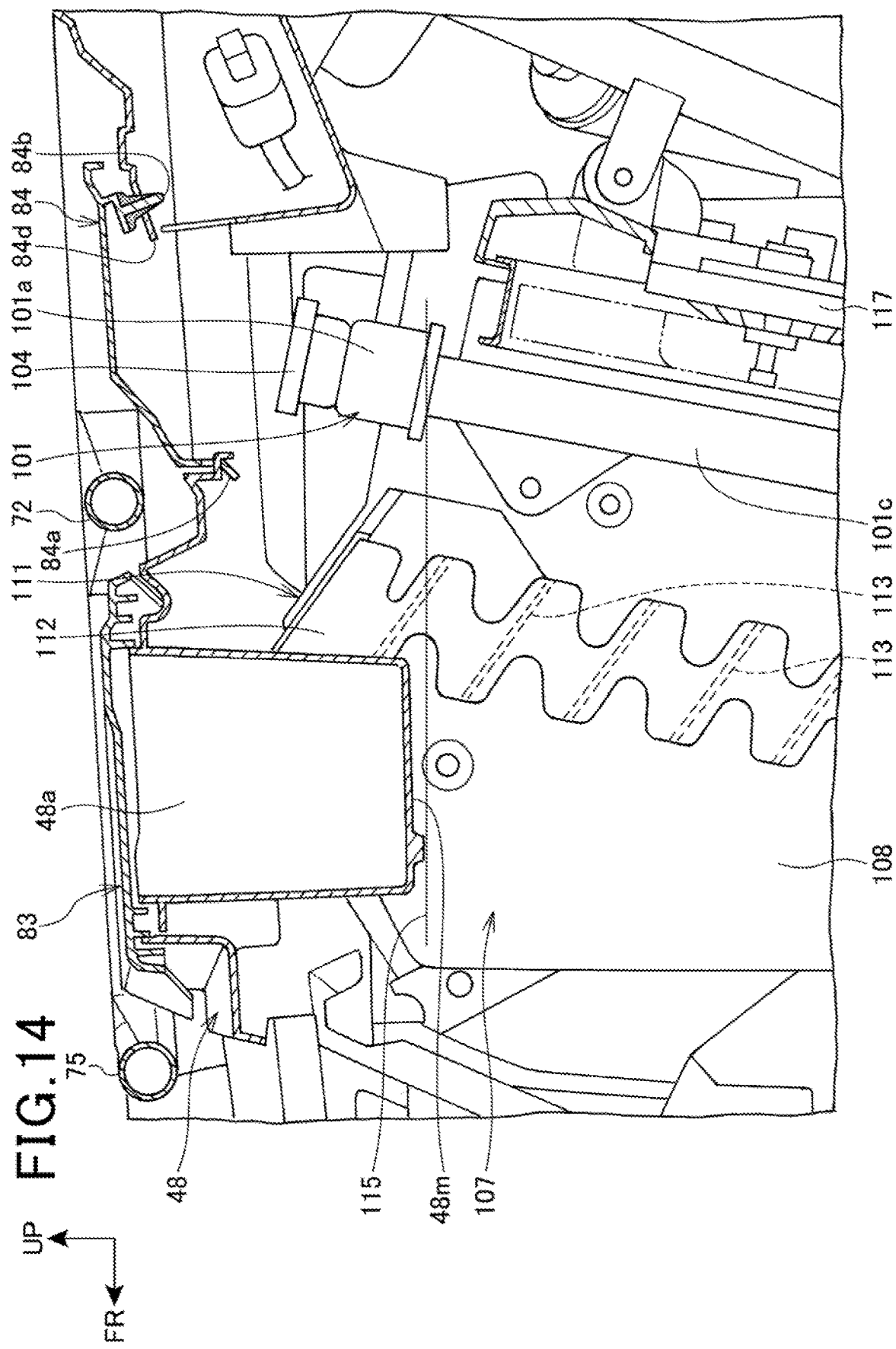
FIG. 14 is a sectional view taken along the line XIV-XIV in FIG. 8.

FIG. 13 is a perspective view of a section taken along a line XIV-XIV in FIG. 8 as seen obliquely from a front upper position. FIG. 14 is a sectional view taken along the line XIV-XIV in FIG. 8.

As illustrated in FIGS. 13 and 14, an air guide space 107, configured to guide running air, is formed below the front center upper cover 48.

The air guide space 107 is formed by the front center upper cover 48, and a pair of left, and right side plates 198 disposed below the front center upper cover 48.

The storage portion 83 (specifically, the storage portion main body 48a), the radiator 101 and louvers 111 disposed ahead of the radiator 101 are disposed in the air guide space 107 between the left and right side plates 108.

The front center upper cover 48, the left and right side plates 108, and the louvers 111 described above make up an air guide portion 110 configured to guide running air to the radiator 101.

The louver 111 is disposed behind and below the storage portion main body 48a and is made up of a frame portion 112 and a plurality of slats 113 which are disposed in the frame portion 112 so as to extend in the vehicle's width direction and to be spaced apart from one another at predetermined intervals in the up-down direction.

Running air flowing into the air guide space 107 from the front of the vehicle passes below the storage portion main body 48a, is rectified toward the direction of the radiator 101 by the plurality of slats 113 of the louver 111, is struck against the radiator 101, and is discharged to the rear of the radiator 101 through the radiator 101.

The radiator 101 includes an upper tank 101a configured to reserve a cooling water, a lower tank (not shown), and a core 101c configured to connect the upper tank 101a and the lower tank together. The core 101c includes a plurality of water passages connecting the upper tank 101a with the lower tank and fins provided between adjacent water passages. When running air passes through the core 101c, whereby the cooling water within the radiator 101 is cooled.

When drawing a horizontal line 115 from an upper end of the core 101c, the horizontal line 115 is located below a bottom wall 48m of the storage portion main body 48a. That is, the core 101c is located further downwards than the bottom wall 48m of the storage portion main body 48a.

A cooling fan 117, configured to force running air into the core 101c for passage, is disposed behind the radiator 101.

As described above, running air can be brought against the radiator 101 effectively by forming the air guide space 107 below the front center upper cover 48. Additionally, running air can be directed toward the radiator 101 so as to easily strike against the radiator 101 by disposing the louver 111 within the air guide space 107. These configurations can enhance further the cooling effect of the radiator 101.

As illustrated in FIG. 14, an engagement portion 84a, configured to be swingably engaged with an edge portion of the maintenance opening 48d in a swinging fashion, is provided on a lower surface of a front end portion of the maintenance lid 84, and a lock portion 84b, configured to be locked on the edge portion of the maintenance opening 48d, is provided on a lower surface of a rear end portion of the maintenance lid 84.

The engagement portion 84a constitutes a hinge portion when opening and closing the maintenance lid 84. Additionally, the engagement portion 84a can be removed by releasing the engagement of the engagement portion 84a from the edge portion of the maintenance opening 48d.

The maintenance lid 84 is kept closed as a result of the lock portion 84b being locked on the edge portion of the maintenance opening 48d.

As illustrated in FIGS. 1, 8 and 10 described above, the all-terrain running vehicle 10 as a vehicle includes the front carrier 32 and the rear carrier 33 as carriers which are provided on the upper portion of the body thereof, and the front carrier 32 and the rear carrier 33 each have the side resting portions 51, 53 which function as the resting portion. The front carrier 32 and the rear carrier 33 are each formed by combining the loop frame portion 71, 91 with the cross member 72, 92, which are both the frame members, into the grid shape.

The front carrier 32 and the rear carrier 33 each include the side resting portions 51, 53 as the pair of left and right resting portions. The side resting portions 51, 53 each include the resting plate 73, 93 as the plate member which forms the loading surface and on which the edge portions of the mounting holes 73h, 73j, 73k, 73m, 93h, 93j, 93k, 93m, which are the plurality of attachment connecting portions, are provided. The resting plate 73, 93 includes the cut-out portions 73e, 73g, 93e, 93g inside the corner portions thereof 71b, 71c, 91b, 91c.

According to this configuration, since the side resting portions 51, 53 each include the resting plate 73, 93 on which the edge portions of the plurality of mounting holes 73h, 73j, 73k, 73m, 93h, 93j, 93k, 93m are provided, the restability of the frame-shaped front carrier 32 and rear carrier 33 can be improved, and the edge portions of the plurality of mounting holes 73h, 73j, 73k, 73m, 93h, 93j, 93k, 93m can easily be formed on the resting plate 73, 93.

In addition, since the resting plate 73, 93 includes the cut-out portions 73e, 73g, 93e, 93g inside the corner portions 71b, 71c, 91b, 91c of the side resting portion 51, 53, the rider or the like can easily grip on the corner portions 71b, 71c, 91b, 91c, and when he or she needs to push or pull the vehicle, the vehicle can be handled by the hands of the rider or the like. Additionally, when goods are rested on the front carrier 32 and the rear carrier 33 with no attachment attached thereto, a rope or the like can be hung on the front carrier 32 and the rear carrier 33. In this way, the functionality of the front carrier 32 and the rear carrier 33 can be improved.

Additionally, as illustrated in FIGS. 8 and 10, the cross member 72, 92 and the front cross member portion 75, the rear cross member portion 95, which constitute the plurality of bridge portions disposed before and after, are formed by the loop frame portion 71, 91 and the cross member 72, 92. The left and right side resting portions 51, 53 are connected by the cross member 72, 92 and the front cross member portion 75, the rear cross member portion 95, and at least one cross member 72, 92 is disposed so as to extend across the left end and the right end of the left and right side resting portions 51, 53.

According to this configuration, the rigidity of the front carrier 32 and the rear carrier 33 can be enhanced by connecting the left and right side resting portions 51, 53 by the plurality of cross members 72, 92 and the front cross member portion 75, the rear cross member portion 95. In addition, the rigidity of each of the left and right side resting portions 51, 53 can be improved by at least one cross member 72, 92.

Additionally, the edge portions of the plurality of mounting holes 73h, 73j, 73k, 73m, 93h, 93j, 93k, 93m are offset from each other in the front-and-rear direction or the vehicle's width direction.

According to this configuration, a plurality of attachments can be connected to the edge portions of the mounting holes 73h, 73j, 73k, 73m, 93h, 93j, 93k, 93m.

In addition, the resting plate 73, 93 includes the cut-out portion 73f, 93f, which constitutes the space forming cut-out portion configured to form the space between the loop frame portion 71, 91 and the resting plate 73, 93, on the one side of the resting plate which is connected to the loop frame portion 71, 91 of the side resting portion 51, 53.

According to this configuration, the weight of the resting plate 73, 93 can be reduced, and hence, a reduction in the weight of the front carrier 32 and the rear carrier 33 can be realized. In addition, the frame of the front, carrier 32 and the rear carrier 33 can easily be reached, whereby the intermediate portion of the front carrier 32 and the rear carrier 33 can be used for handling by the hands or hanging a rope or the like.

Additionally, since the cross member 72, 92 is exposed from the cut-out portion 73f, 93f, a reduction in rigidity due to forming the cut-out portion 73f, 93f in the resting plate 73, 93 can be compensated for by the cross member 72, 92. Additionally, the cross member 72, 92 can easily be reached, whereby the cross member 72, 92 can be used as a hanging part for a rope or the like, and hence, the configuration can be applied to many applications.

In addition, the cut-out portion 73f is positioned between the edge portions of the plurality of mounting holes 73k, 73m. The cut-out portion 93f is positioned between the edge portions of the plurality of mounting holes 93k, 93m.

According to this configuration, the edge portions of the plurality of mounting holes 73k, 73m can be provided in the resting plate 73, 93 while avoiding the cut-out portion 73f, 93f.

Additionally, the base portion forming the base structure of the front carrier 32 and the rear carrier 33 is made up of the single loop frame portion 71, 91, and this single loop frame portion 71, 91 includes the front cross member portion 75, the rear cross member portion 95.

According to this configuration, the number of parts can be reduced by making up the base portion using the single loop frame portion 71, 91, and hence, the cost can be reduced.

In addition, the single loop frame portion 71, 91 includes the loop portion 71a, 91a, which is formed into the closed loop shape, at each of both the end portions thereof, and the resting plate 73, 93 is attached to the front portion, the side portion and the rear portion of the loop portion 71a, 91a.

According to this configuration, the strength and rigidity of the loop portion 71a, 91a can be enhanced by the resting plate 73, 93.

The embodiment that has been described above describes only one aspect of the present invention, and hence, the embodiment can be modified and applied to arbitrarily without departing from the spirit and scope of the present invention.

For example, in the embodiment described above, as illustrated in FIGS. 8 and 10, while the left and right resting plates 73 on the front carrier 32 are provided separately from the resting plates 93 on the rear carrier 33, the present invention is not limited to this. For example, the left-hand side resting plate 73 on the front carrier 32 and the right-hand side resting plate 93 on the rear carrier 33 may be formed into the same shape so that they become common parts. Similarly, the right-hand side resting plate 73 on the front carrier 32 and the left-hand side resting plate 93 on the rear carrier 33 may be formed into the same shape so that, they become common parts.

Additionally, as illustrated in FIG. 11, while the storage portion main body 48a of the storage portion 83 is formed integrally on the front center upper cover 48, the present invention is not limited to this. For example, a storage portion main body may be formed separately from the front center upper cover 48 to be attached to the front center upper cover 48.

In addition, while the present, invention has been described as being applied to the all-terrain running vehicle 10, which is the four-wheeled saddle riding vehicle, the present invention is not limited to this, and hence, the present invention may be applied to a three-wheeled saddle riding vehicle. Alternatively, the present invention may be applied to a vehicle with a carrier other than the saddle riding vehicle.

REFERENCE SIGNS LIST 10 all-terrain running vehicle (vehicle)
32 front carrier (carrier)
33 rear carrier (carrier)
51, 53 side resting portion (resting portion)
71, 91 loop frame portion (frame member)
71b, 71c, 91b, 91c corner portion
72, 92 cross member (frame member, bridge portion)
73, 93 resting plate (plate member)
73e, 73g, 93e, 93g cut-out portion
73f, 93f cut-out portion (space forming cut-out portion)
73h, 73j, 73k, 73m, 93h, 93j, 93k, 93m mounting hole edge portion (attachment connecting portion)
75 front cross member portion (bridge portion)
95 rear cross member portion (bridge portion)

What is claimed is:

1. A vehicle comprising a carrier having resting portions on an upper portion of a body, the carrier being formed by combining frame members into a grid shape,
wherein the carrier comprises a pair of left and right resting portions,
wherein each of the resting portions comprise a plate-shaped resting plate forming a loading surface,
wherein the resting plate is formed from a flat plate and includes a plurality of hole-shaped attachment connecting portions to which attachments capable of fixing, holding and accommodating goods are detachably locked on, and the resting plate
comprises a cut-out portion that is provided inside a corner portion of the resting portion, the cut-out portion is cut out to provide a space between the frame member and the resting plate, and
wherein an inclined portion, which is formed by bending the flat plate, is provided on edge portions of the attachment connecting portion and the cut-out portion.

2. The vehicle according to claim 1,
wherein the frame members form a plurality of bridge portions disposed before and after,
wherein the left and right resting portions are connected together by the bridge portions, and
wherein at least one of the bridge portions is disposed so as to extend across a left end and a right end of the left and right resting portions.

3. The vehicle according to claim 2,
wherein the plurality of attachment connecting portions are offset from each other in a front-and-rear direction or a vehicle's width direction.

4. The vehicle according to claim 2,
wherein the cut-out portion forms a space between the frame member and the plate member on one side of the plate member that is connected to the frame member of the resting portion.

5. The vehicle according to claim 4,
wherein the bridge portion is exposed via the cut-out portion.

6. The vehicle according to claim 4,
wherein the cut-out portion is positioned between the plurality of attachment connecting portions.

7. The vehicle according to claim 2,
wherein a base portion forming a base structure of the carrier is formed by a single frame member, and
wherein the single frame member includes one of the bridge portions.

8. The vehicle according to claim 7,
wherein the single frame member comprises a loop portion provided at each of both end portions of the single frame member, the loop portion being formed into a closed loop shape, and
wherein the plate member is attached to a front portion, a side portion and a rear portion of the loop portion.

9. The vehicle according to claim 3,
wherein the cut-out portion forms a space between the frame member and the plate member on one side of the plate member that is connected to the frame member of the resting portion.

10. The vehicle according to claim 5,
wherein the cut-out portion is positioned between the plurality of attachment connecting portions.

11. The vehicle according to claim 3,
wherein a base portion forming a base structure of the carrier is formed by a single frame member, and
wherein the single frame member includes one of the bridge portions.

12. The vehicle according to claim 4,
wherein a base portion forming a base structure of the carrier is formed by a single frame member, and
wherein the single frame member includes one of the bridge portions.

13. The vehicle according to claim 5,
wherein a base portion forming a base structure of the carrier is formed by a single frame member, and
wherein the single frame member includes one of the bridge portions.

14. The vehicle according to claim 6,
wherein a base portion forming a base structure of the carrier is formed by a single frame member, and
wherein the single frame member includes one of the bridge portions.

* * * * *